United States Patent [19]

Cox

[11] 4,125,057

[45] Nov. 14, 1978

[54] PLANETARY MILLING MACHINE

[76] Inventor: Kris E. Cox, 1125 W. 190 St., Gardena, Calif. 90248

[21] Appl. No.: 672,294

[22] Filed: Mar. 31, 1976

[51] Int. Cl.² .............................................. B23C 3/32
[52] U.S. Cl. ...................................... 90/11.58; 51/90; 82/1.4; 90/11.4; 90/DIG. 8; 90/DIG. 11
[58] Field of Search ................... 90/11.58, 11.4, 11.42, 90/11.40, 11.12, 11.66, 11.54, DIG. 8, DIG. 11; 74/387, 22 R; 408/185; 51/90, 95 TG; 82/1.4, 1.5

[56] References Cited

U.S. PATENT DOCUMENTS

| 1,169,231 | 1/1916 | Boxill | 51/90 X |
| 3,762,272 | 10/1973 | Escobedo | 90/11.58 |

*Primary Examiner*—John Sipos
*Attorney, Agent, or Firm*—Howard L. Johnson

[57] ABSTRACT

Motor driven milling and boring machine used primarily for forming screw threads of any selected pitch, external to cylindrical or conic projection or within similar-shaped bore of workpiece, particularly workpieces such as are too large or irregular-shaped to be themselves rotated. A tubular housing, upstanding or tiltably disposable, journals a longitudinally displaceable and rotatable hanger which in turn axially journals a power-driven spindle having a selectively offset-positionable stub portion, terminally carrying a thus radially extensible drive segment which distally positions a rotary milling cutter. A second or planetary tracking motor jointly operates a pair of selectively coupled ring gears of the housing, which in conjunction with a master nut fixed along the housing axis, move the hanger respectively annularly and axially so that the distal cutter may follow a helical path, the pitch of which path is determined by the chosen velocity ratio give the two ring gears. A particular velocity ratio results from the choice of gearing assembled in a detachable twin-segment gear train cassette insertable between the pair of ring gears. While remaining in place, the gear train may be disengaged from one drive component of the hanger to enable arcuate resetting for production of multi-start threads, or alternately to provide annular or linear movement of the cutter. A collar-shaped electromagnetic support base has associated tactile means for centering it, and hence centering the milling machine subsequently mounted thereupon, relative to the preformed bore of a workpiece which is to be threaded. Radial thrust-retraction means are provided for quick-withdrawal of a cutter head from a workface so that it can then be lifted out of a bore without retracing the helical entrance path.

23 Claims, 34 Drawing Figures

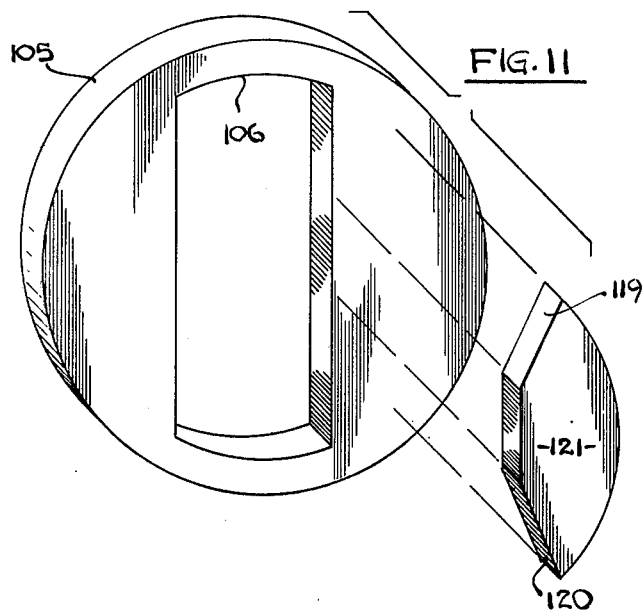
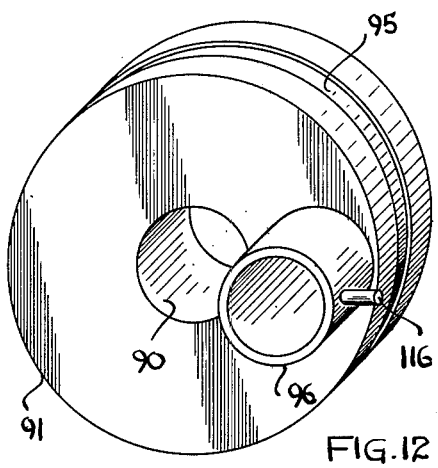
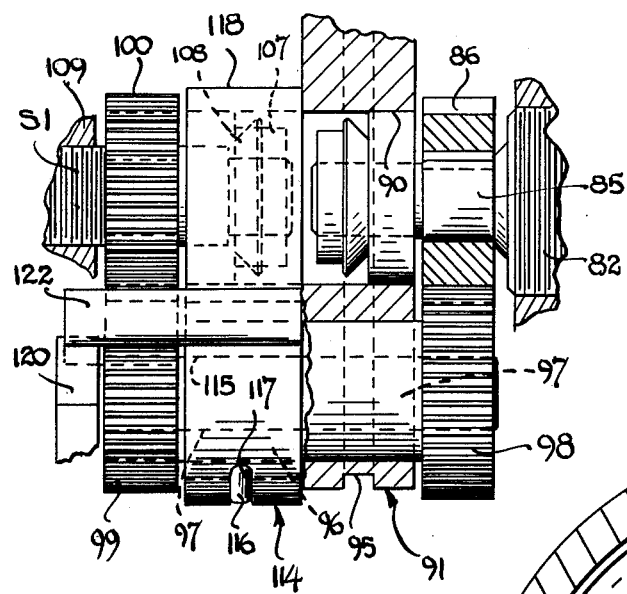
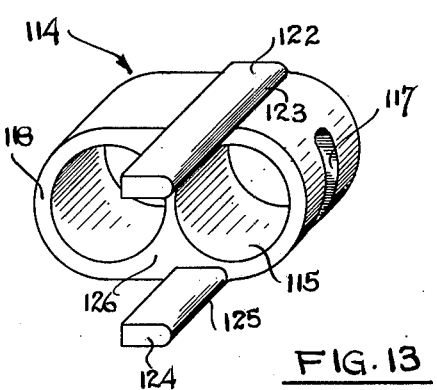
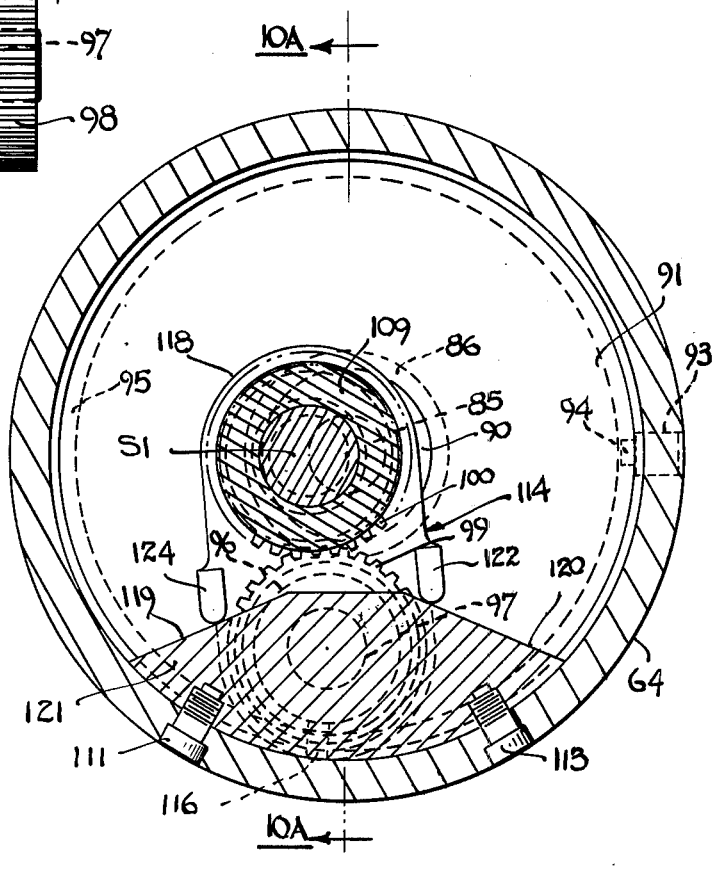

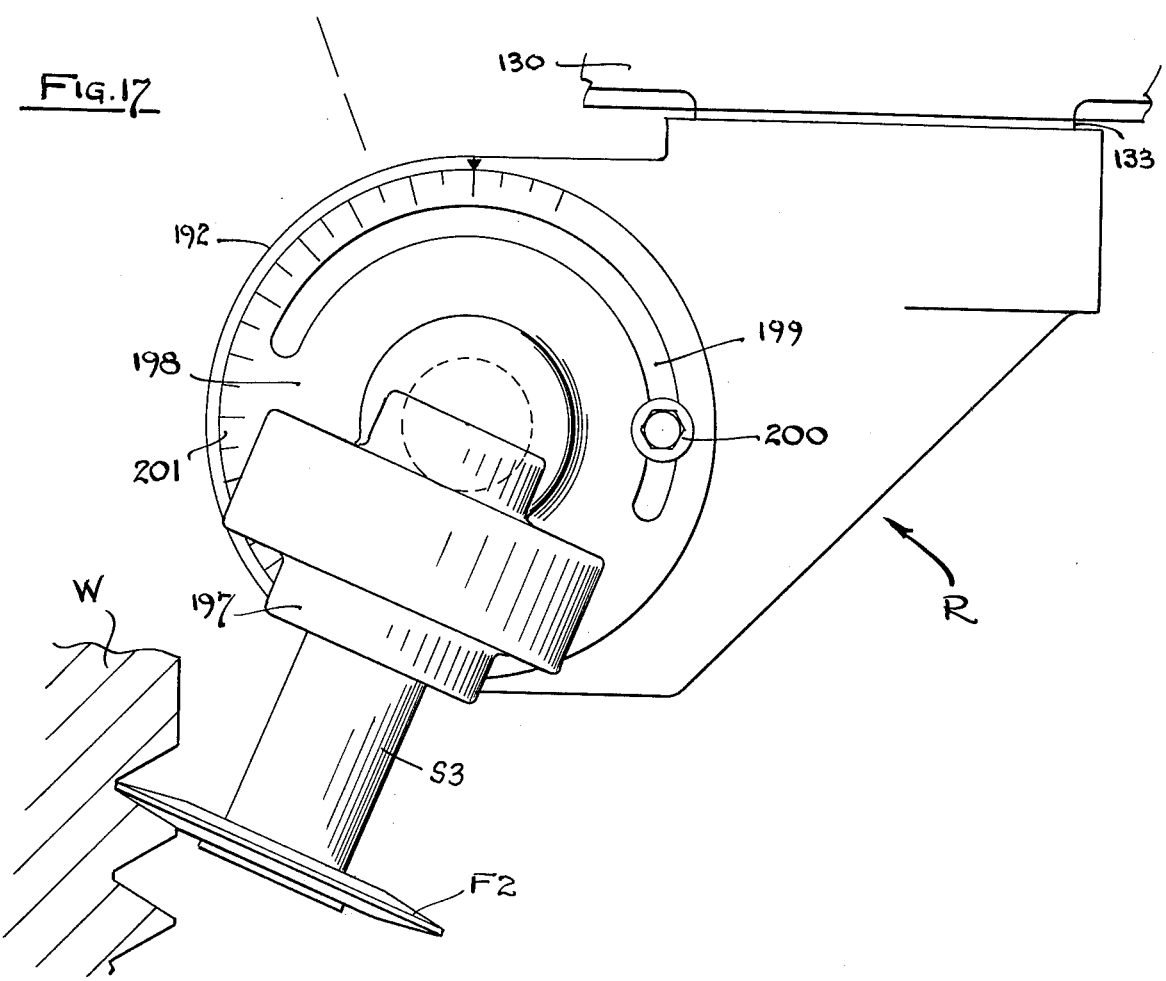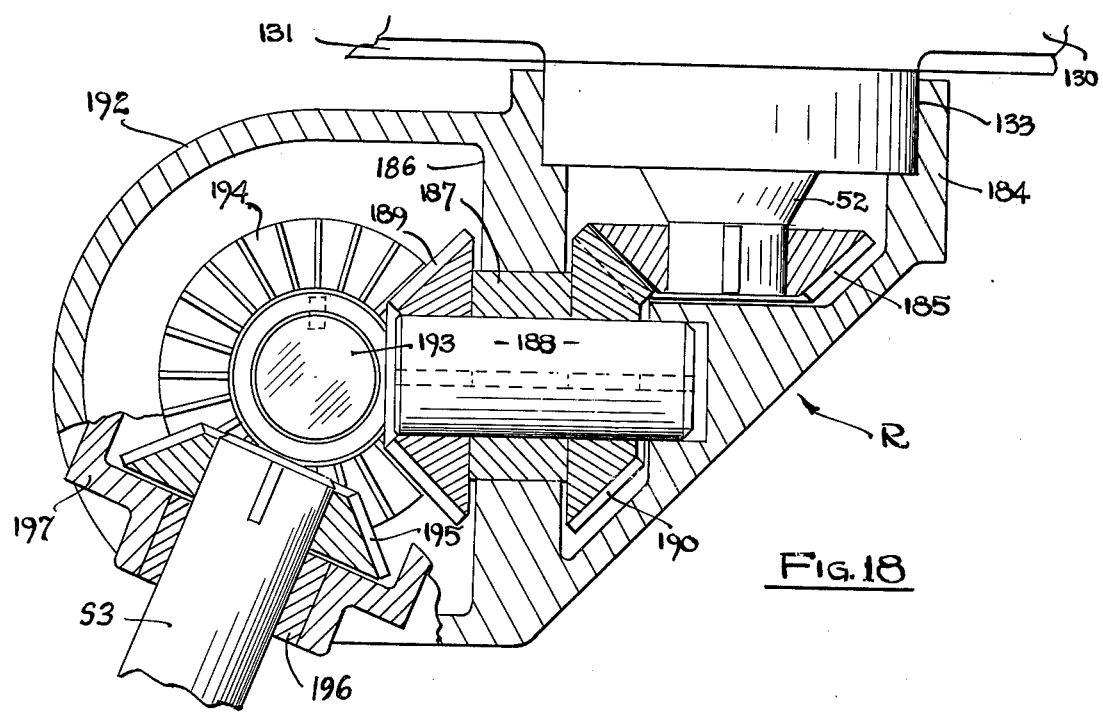

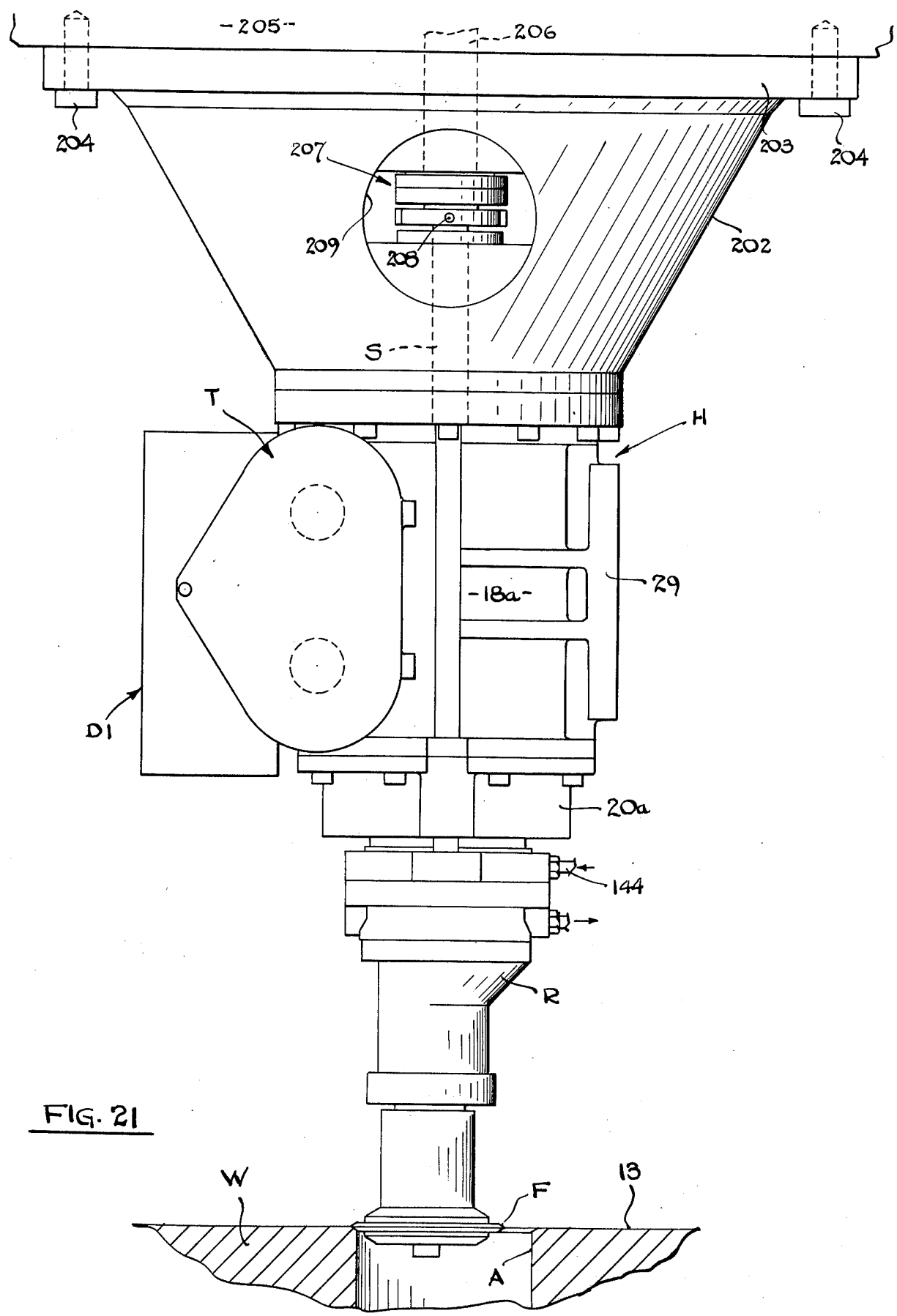

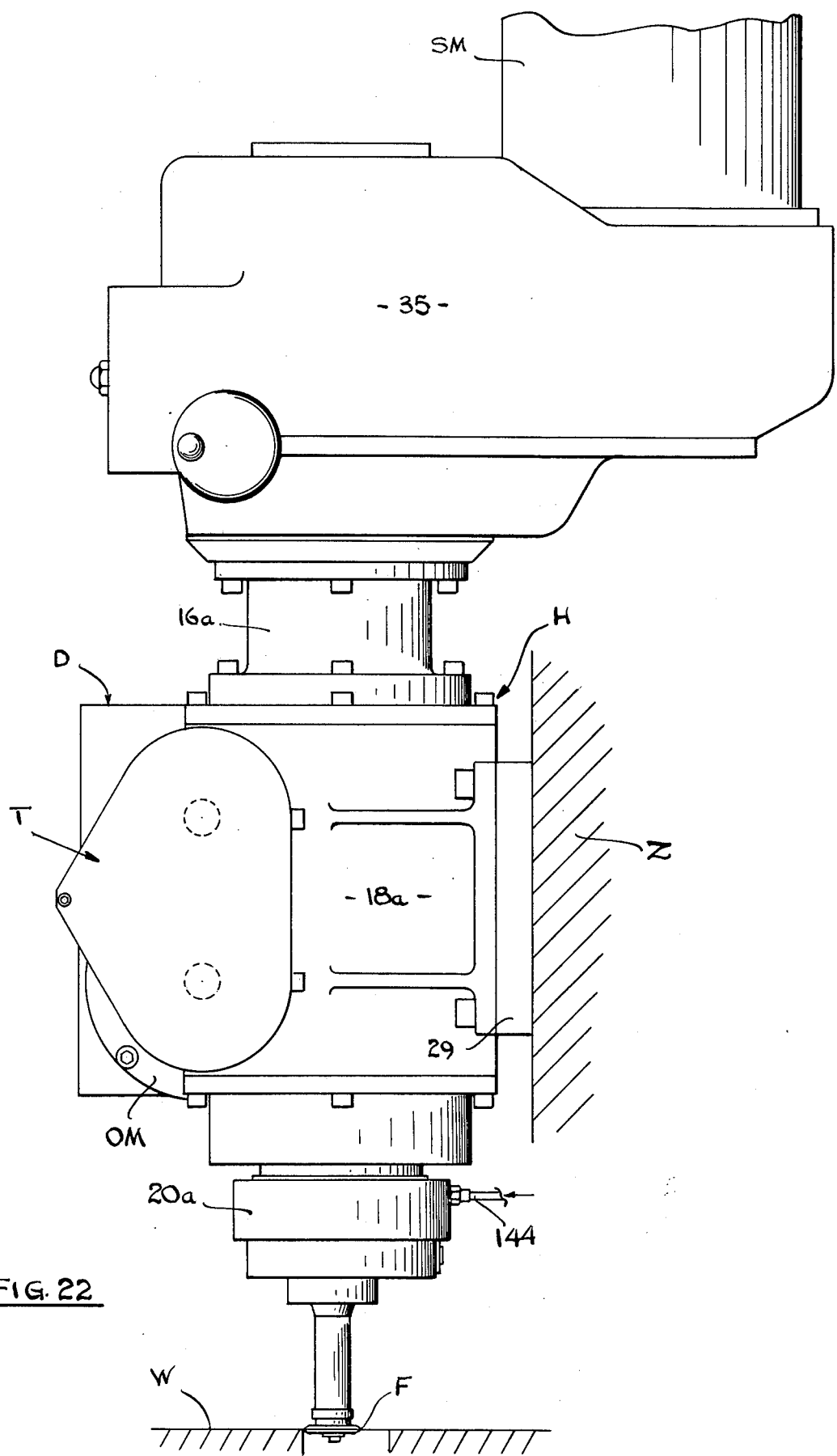

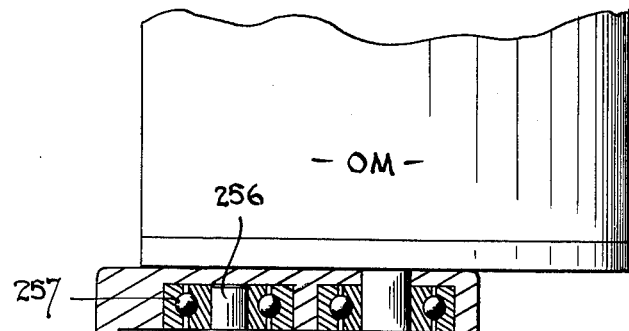
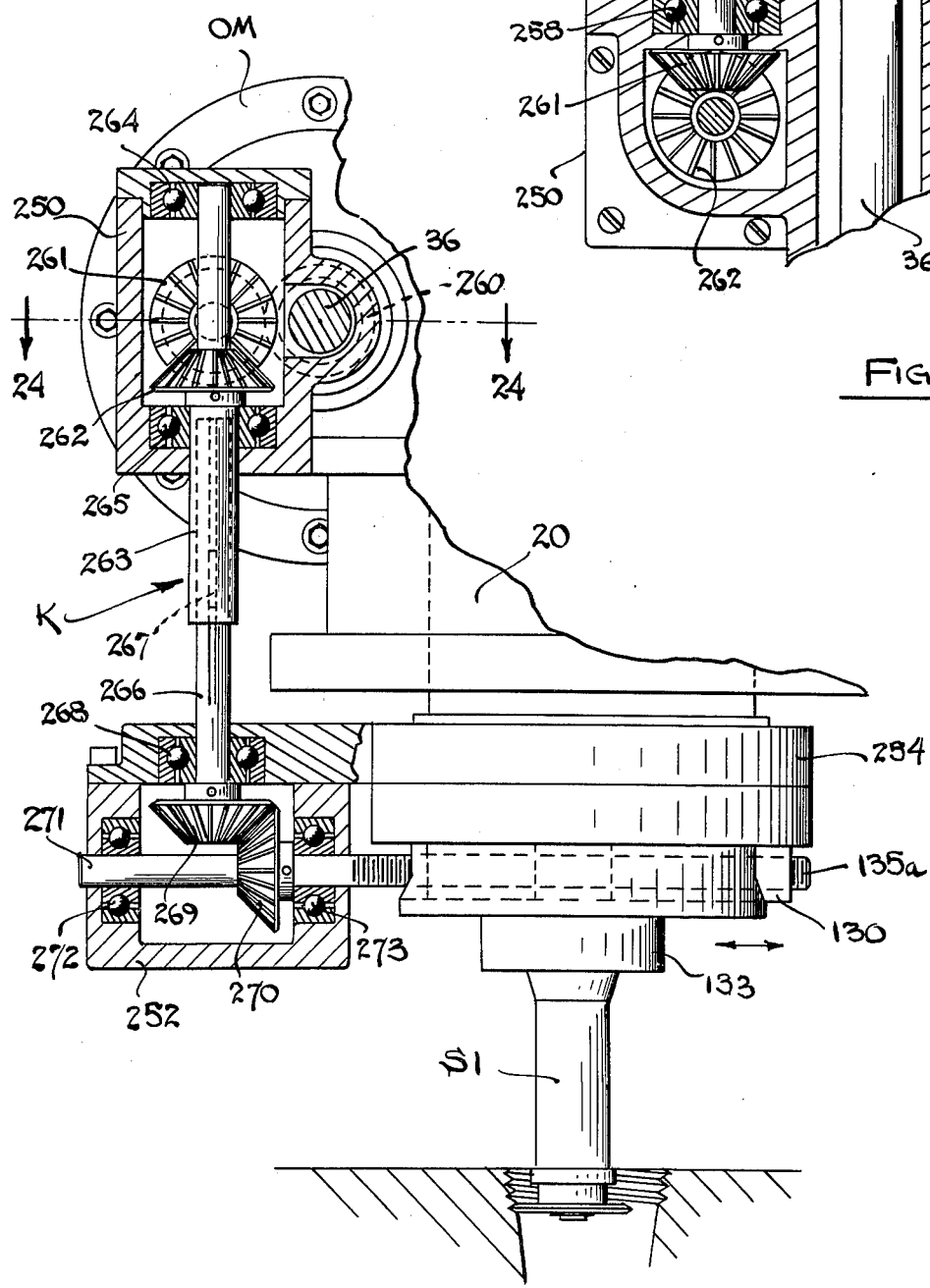

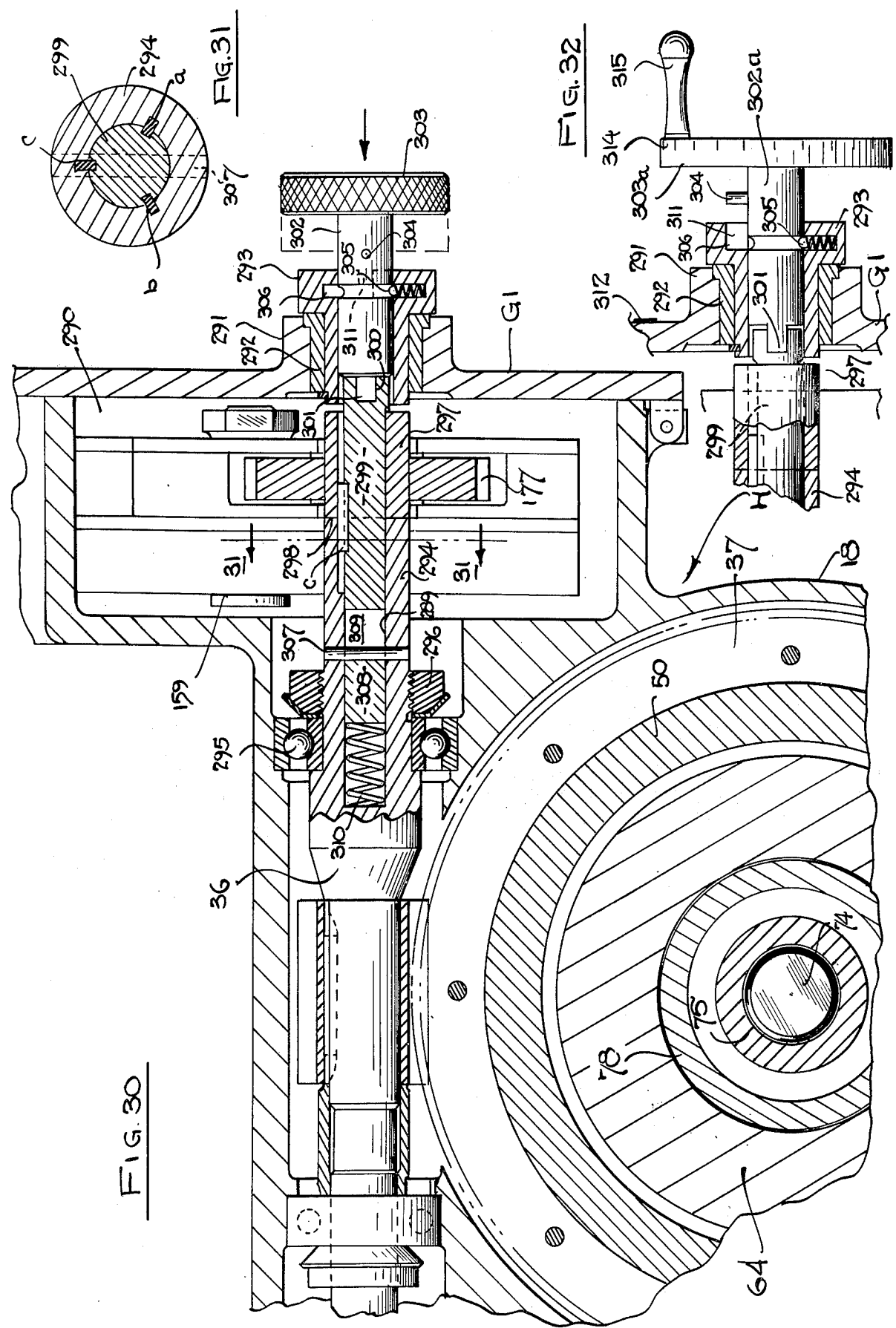

PLANETARY MILLING MACHINE

BACKGROUND OF THE INVENTION

Small rapidly rotating blades or rotary cutters have long been carried by the spindle of a milling machine and used to mill various patterns or make desired cuts either on stationary or sliding workpieces, or else on a symmetrical workpiece such as might be simultaneously rotated by a lathe relative to the cutter. As a more specialized usage, by employment of a helical guide — applied either to the moving workpiece or to the axially progressing cutter — such assembly was utilized in the past to cut screw threads. Such thread pattern obviously had to be formed on the inner or outer surface of a cylindircal bore or projection of the workpiece. If the remainder or bulk of such workpiece was too large or unwieldy to be rotated, it remained at rest and all handling or manipulation was done by the cutter assembly. Such procedure is necessary, for example, in threading the necks of turbine housings or large reaction vessels which it is not practical to rotate. When the cutter unit then has to assume almost any possible position, it no longer becomes feasible to power it from the spindle of a stationary milling machine. Accordingly the cutter assembly is then given its own drive motor and in effect is made completely portable. In addition, a distal segment of the cutter spindle is made adjustably displaceable radially so as to contact work surfaces of different diameters, without cessation of the rotary drive of the operating spindle. However, guide means are still required to plot or set the helical path followed by the cutter in forming screw threads; that is, every difference in pitch requires guidance along a different track or path. By the prior art, this was effected by use of a pair of threadedly-engaging guide tubes (one of which remained stationary and the other moved spirally therein) such pairs being inserted from time to time in the assembly to provide a pattern which the cutter then transferred, in effect, to the workpiece. To cut threads of a different pitch, such pair of guide tubes had to be removed from the assembly and another pair of a different pitch substituted in their place. Such procedure could be tedious and time consuming, and always required a supply of the preformed pairs. Such a milling cutter is shown in U.S. Pat. No. 3,762,272.

BRIEF STATEMENT OF THE INVENTION

Accordingly it is an object to provide such a portable thread milling machine which may be applied to a conic or cylindrical, stationary workpiece to form screw threads of any desired pitch. There are two motors or separate rotary drive means, one of which drives the milling spindle/cutter at a speed related to the particular metal being milled. The other drive means operates a tracking assembly which carries or positions the independently rotating cutter in (a) an annular or planetary path, and (b) in an axial or longitudinally extensible path. Correlation of these two simultaneous paths results in a helical path given to the rotary cutter such as is followed in forming screw threads. The pitch of the thread is that of the helical path and this can be varied by change of the velocity ratio between (a) and (b). Thus if the annular/planetary movement is held constant, the helical path is determined by the relative speed of the axial movement. If the two movements are both simultaneously operated as components of a continuous drive train, the linkage or gearage between the two components will determine the velocity ratio, which ratio can be change by shifting to a different gearage. Such change can be effected most simply by substitution of one gear train for another between the planetary and axial drive components. While this general concept may not be new as such, its practical utilization has long been elusive, and its embodiment in the present portable thread milling machine is a notable advance.

The present highly effective construction is based on use of a simultaneously rotationally and axially movable hanger element (which carries the radially-extensible rotary milling cutter), the hanger being axially disposed within a tubular or cylindrical housing structure wherein its two components of movement are furnished by separate ring gears which—in association with a fixed lead nut and threadedly engaged guide element—serve to move the hanger axially at one speed and rotationally at another speed. Easy correlation of the speeds of the pair of ring gears is effected by making them of the same diameter and driven by mutually parallel worms, thus mounted tangential or transversely to the ring gears and housing tube so that attachment ends of their respective drive shafts lie along a plane generally common to the longitudinal housing axis or main spindle. Such adjacent ends of the worm shafts can then be detachably coupled to terminal gears of a gear train advantageously carried in a two-component (articulated) cassette housing. Thus, the detachable housing provides support and positioning means for the two terminal gears of the train, spaced apart a fixed distance corresponding to the separation of the pair of worm drive shafts with which they are thrust-engageable (or otherwise attachable).

Accommodation of individual gear train components of different radii, in the package or composite housing is effected by coupling two flat-sided housing components in juxtaposition with each other, retained by anchorage of a transverse bearing shaft for the intermediate gears, the longitudinal axes of the two housing components being disposed at an acute or obtuse angle as the case may be. Accordingly any desired mechanical advantage or gearage can be produced in the gear train simply by assembling conventional size gears in such a dual-segment planar (sandwiched) cassette or housing cartridge. By substitution of such tramsmissions the cutter can be shifted quickly from cutting inch-measured threads to metric threads or vice versa; similarly, in the same measuring system, shift can be made at will to threads of a different pitch. Modification is also provided for selectively tilting the cutting head (including that of a milling cutter) for producing different shaped or slanted threads.

Such cassette housing components are also provided with means for selectively disengaging one terminal gear from its corresponding drive shaft (i.e. the annular or planetary drive component) without dislodging the positioned ("mounted") cassette or gears, so that (a) the hanger and its carried work-contact element can be moved in a simple annular or planetary path, or (b) the drive shaft for such annular tracking can be (manually) reset by a selected fraction of 360° in order to cut (upon reengagement) multi-start threads of the same (helical) pitch. For example, for one-inch pitch threads, four such multi-start threads could be cut, each 90° displaced from its adjacent threads which were mutually parallel. Such gear train cassettes, both with and without the restart position-means, are believed new per se. The cassette assemblies can also be reversed end-to-end and recoupled to the drive shafts so as to provide a transmission with the opposite mechanical advantage. Likewise the gear-disconnect means can be coupled to the drive shaft of the axial component, so that the start position of the latter can be (manually) reset.

Other subunits or accessories are also new per se, as well as in the composite assembly. An electromagnetic collar or support base is provided for use with the tracking assembly or milling assembly. Associated centering means are provided for locating the base and supported assembly disposed coaxial with the preformed bore of a workpiece which is to be threaded. A succession of such workpieces can each be aligned with a different (identical) base, and the cutter assembly transferred from one base to another as each bore is threaded in turn. After inspection, the assembly can be returned to the still-anchored base to further cut the threads if desired.

There is also provided a quick thrust-retraction unit for withdrawing a work-engaged contact element from the face of an engaged bore, so that the assembly can be lifted out of the bore without first retracing the helical entrance path. It will also be appreciated that the exemplified radially-extensible rotary drive spindle can be replaced by a diametric cutting wheel which is eccentrically disposed by the offcenter main-spindle positioning means. It will also realized that use of the helically tracking guidance and operating assembly detailed herein is not limited to association with a milling cutter. The unit may carry an abrasive or polishing head, or a brush or wiping element, a spray or suction nozzle, or may simply move a display or target element in such path.

BRIEF DESCRIPTION OF THE DRAWINGS

FIG. 10 is a transverse section along the line 10—10 of FIG. 9.

FIG. 10A is an axial section along line 10A—10A of FIG. 10.

FIG. 11 is a perspective view of an associated pair of guide members used for offcenter shift of the drive spindle, the forward cam shown in its special relation to the apertured guide disk.

FIGS. 12 and 13 are perspective views of interengagement elements of the offcenter shift mechanism of FIGS. 9-10A.

FIG. 17 is an elevational view of a tiltable cutting head which may be carried by the assembly in place of the cutter of FIG. 2.

FIG. 18 is a sectional view through the cutting head of FIG. 17 with some structures seen in elevation.

FIG. 21 is an elevational view of the milling machine without the spindle drive motor and upper structure of FIG. 1 and with an added attachment collar shown bolted to the underface of a boring machine, with the drive spindle of the latter operatively coupled to the main spindle of the planetary milling machine.

FIG. 22 is an elevational view of the assembly of FIG. 1 shown attached to a support member by a lateral attachment bracket.

FIG. 23 is a longitudinal sectional view with portions in elevation, of a fragment of the milling assembly with an attached auxilliary guide unit used for directing the helical path of the rotary cutter along a conic worksurface.

FIG. 24 is a transverse sectional view taken along the line 24—24 of FIG. 23 particularly showing the connection of the guide unit to the lower worm shaft, the connecting gear cassette of FIGS. 7-8 not appearing.

FIG. 30 shows in axial section and elevation a portion of the drive mechanism and coupled cassette of FIG. 5 but with a modified coupling mechanism which enables temporary disengagement of one of the drive shafts from the gear train, without any displacement of the cassette or gears.

FIG. 31 is a transverse section taken along the line 31—31 of FIG. 30.

FIG. 32 is a sectional and elevational detail of a further modification embodying a manual crank handle used for turning the disengaged shaft a fractional rotation to a new starting position as guaged by alignment of arcuate calibration means.

DETAILED DESCRIPTION OF A PREFERRED EMBODIMENT

Figure 1:
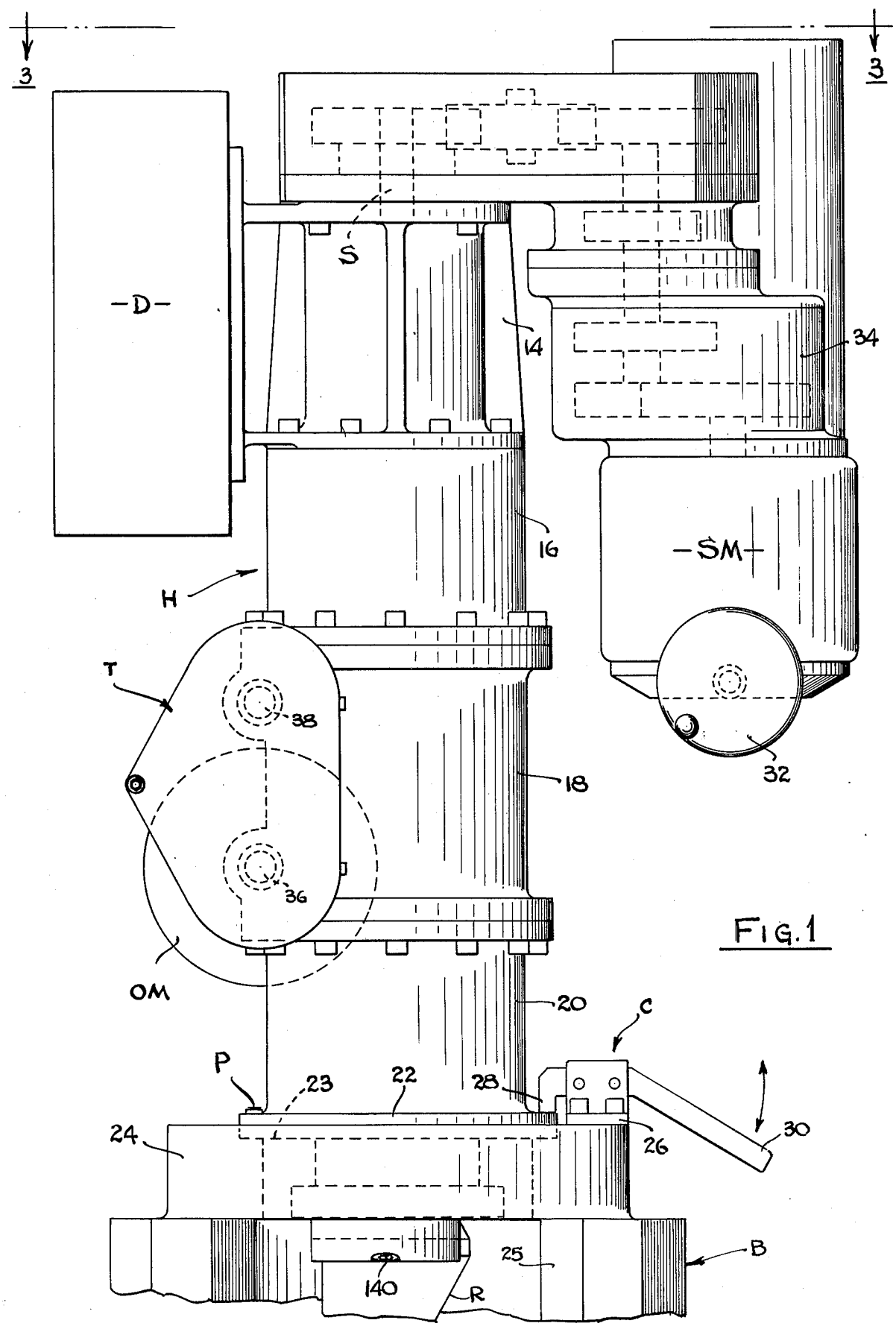
FIG. 1 is an elevational view of a planetary milling machine embodying the invention, shown supported upstanding upon an electromagentic base which centers the machine relative to a preformed bore of an underlying workpiece which is to have screw threads cut therein.
Figure 2:
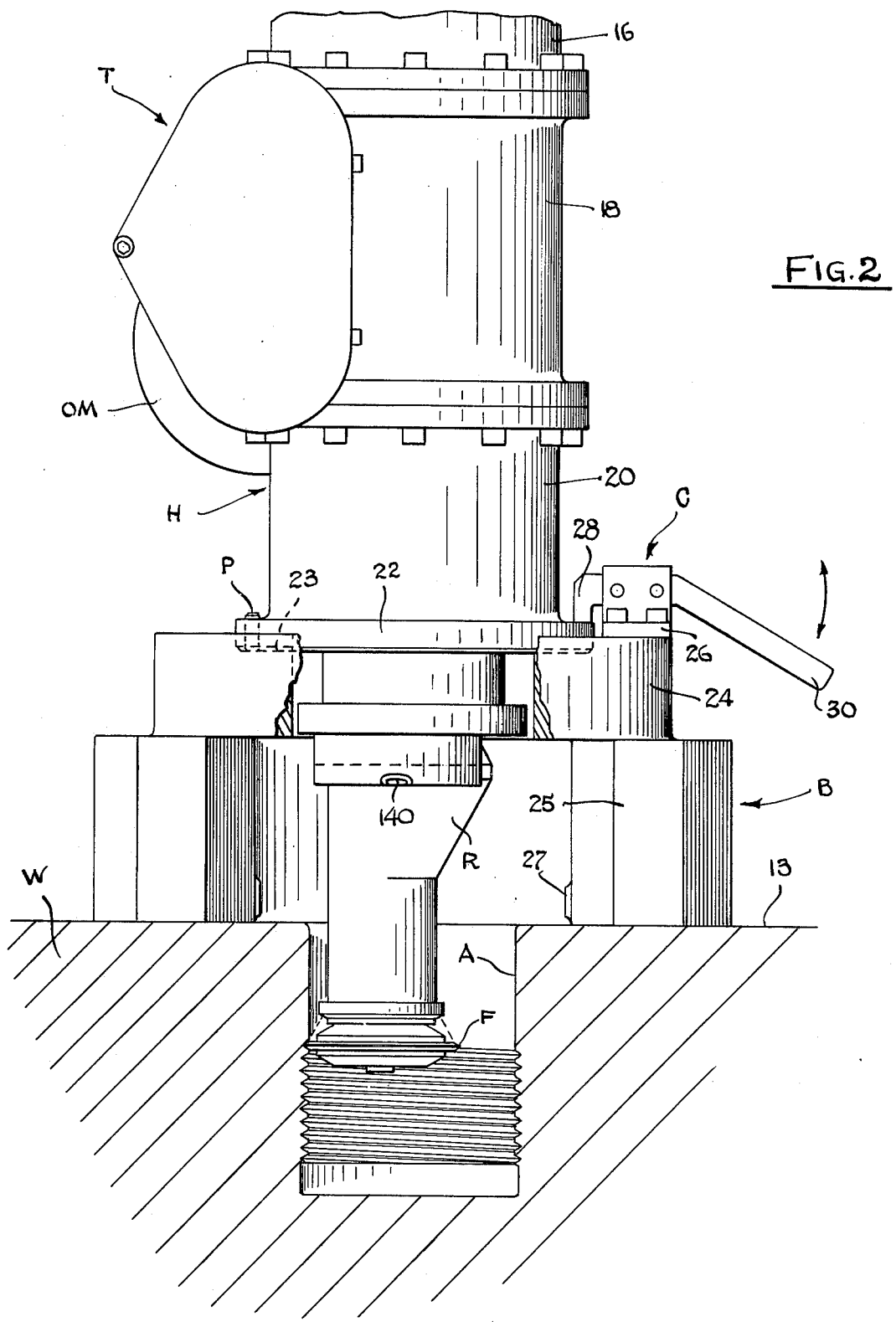
FIG. 2 shows in elevation the lower portion of the machine of FIG. 1 with the base broken away and a bore-containing fragment of the workpiece seen in vertical section.
Figure 3:
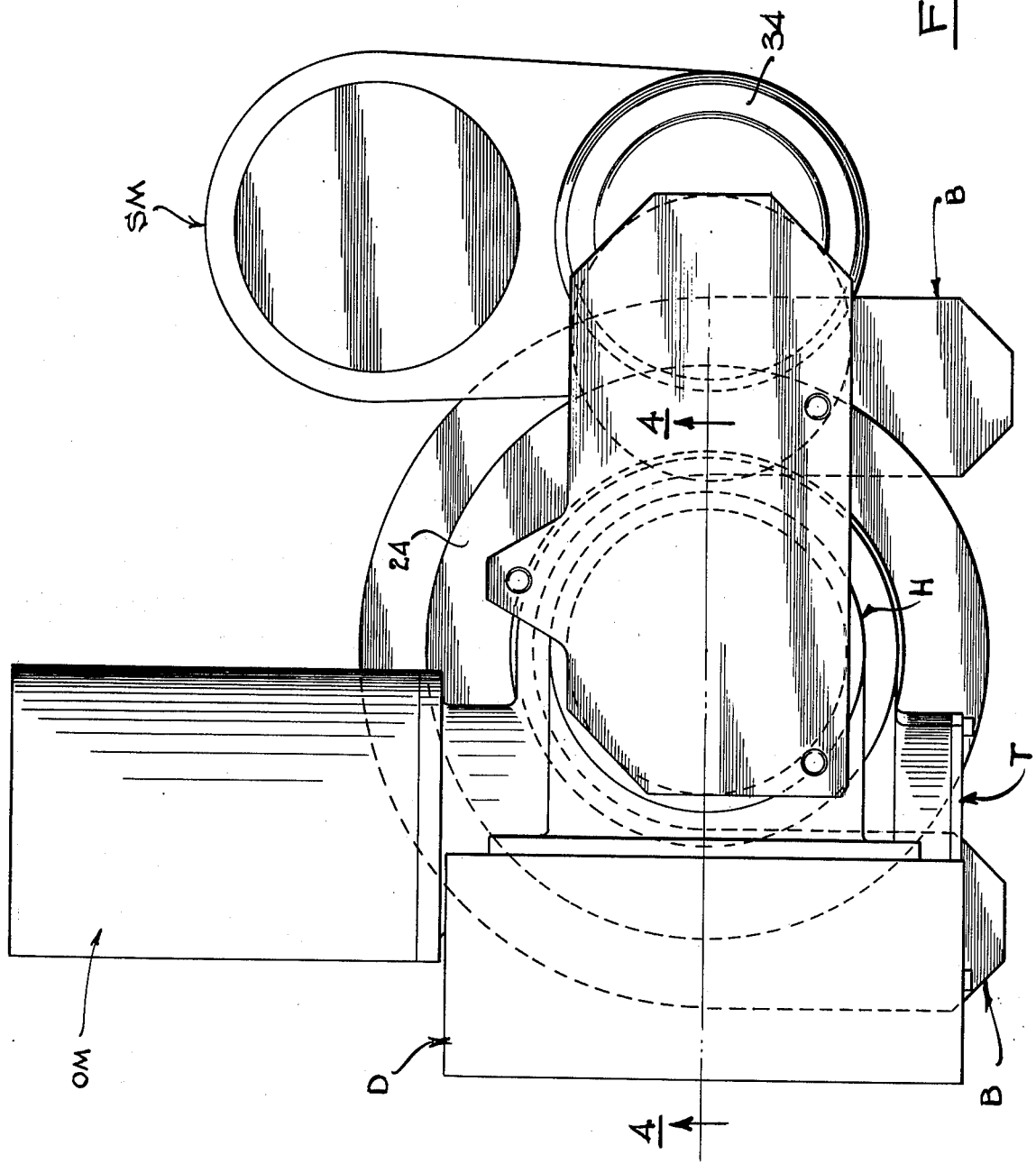
FIG. 3 is a top plan view of the machine as viewed along the line 3—3 of FIG. 1.

An upstanding tubular housing or tower H is formed of four vertically stacked, cylindrical segments 14, 16, 18, 20, peripherally bolted to each other through juxtaposed flanges, with the assembly being detachably mounted upon an incomplete-ring or U-shaped, electromagnetic base B. A lowermost flange 22 of the tower has its base portion received in an annular open-top socket or recess 23 of a flat top collar area 24 of the base. In use, the latter is first centered relative to a preformed bore A of a workpiece W and the support flange 22 is anchored to the base B by inserted pins P, and by an opposite-edge, toggle action clamp C which is upstanding from an anchorage plate 26 permanently secured atop the base. A holddown arm 28 is brought to bear upon the upperface of the socketed flange 22 when manually activated by the handle 30. The tower can thus be readily detached from the work and quickly transferred and coupled to another similar base which has been aligned wth an adjacent workpiece which is to be threaded. Alternately, the tower H in tilted or transverse position can be mounted on a (fixed or movable) support-standard by means of a lateral attachment bracket 29 (FIGS. 21 & 22), and thus aligned with a more-or-less transverse workpiece.

Figure 4:
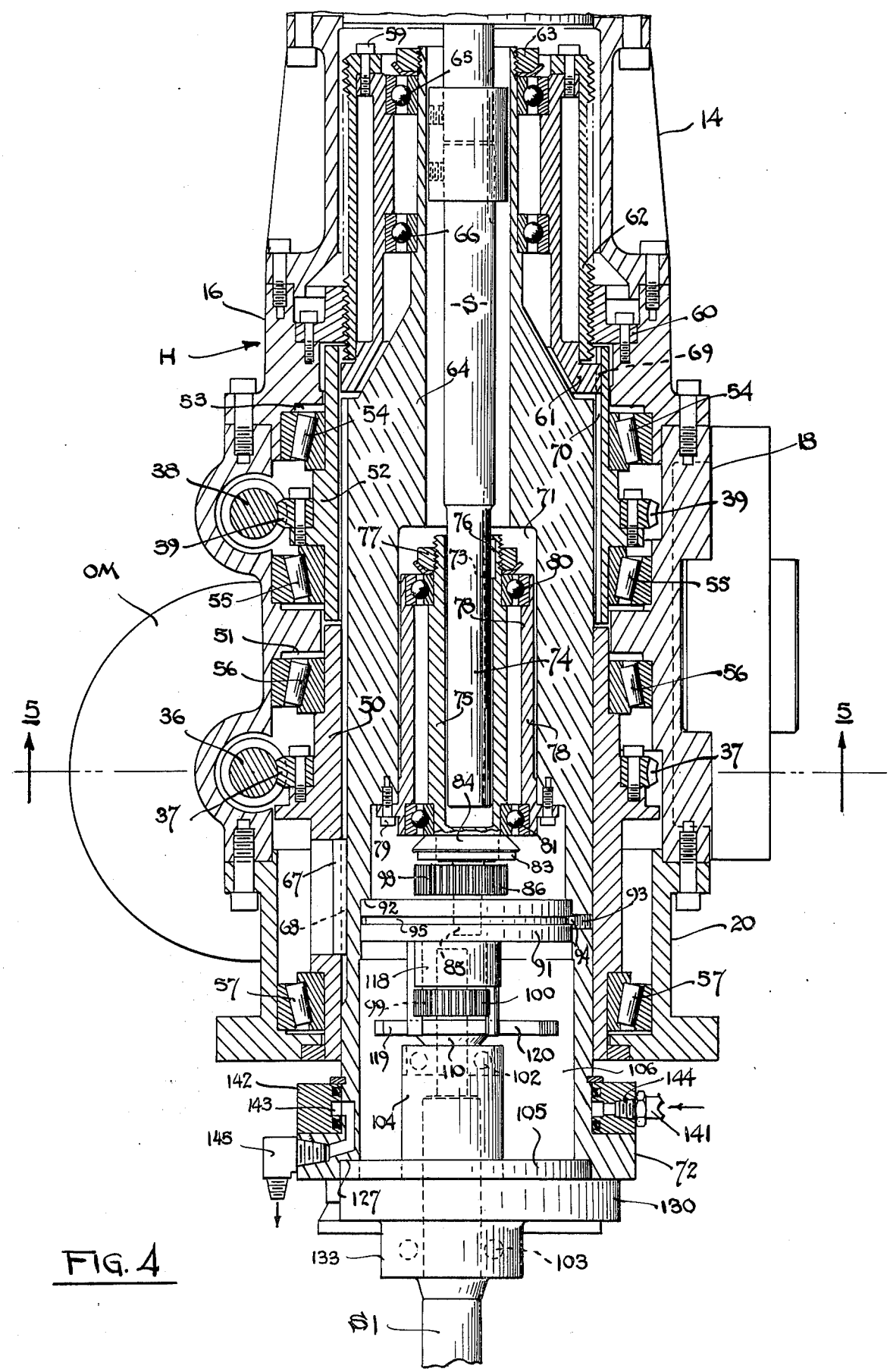
FIG. 4 is a longitudinal sectional view taken along the line 4—4 of FIG. 3.
Figure 5:
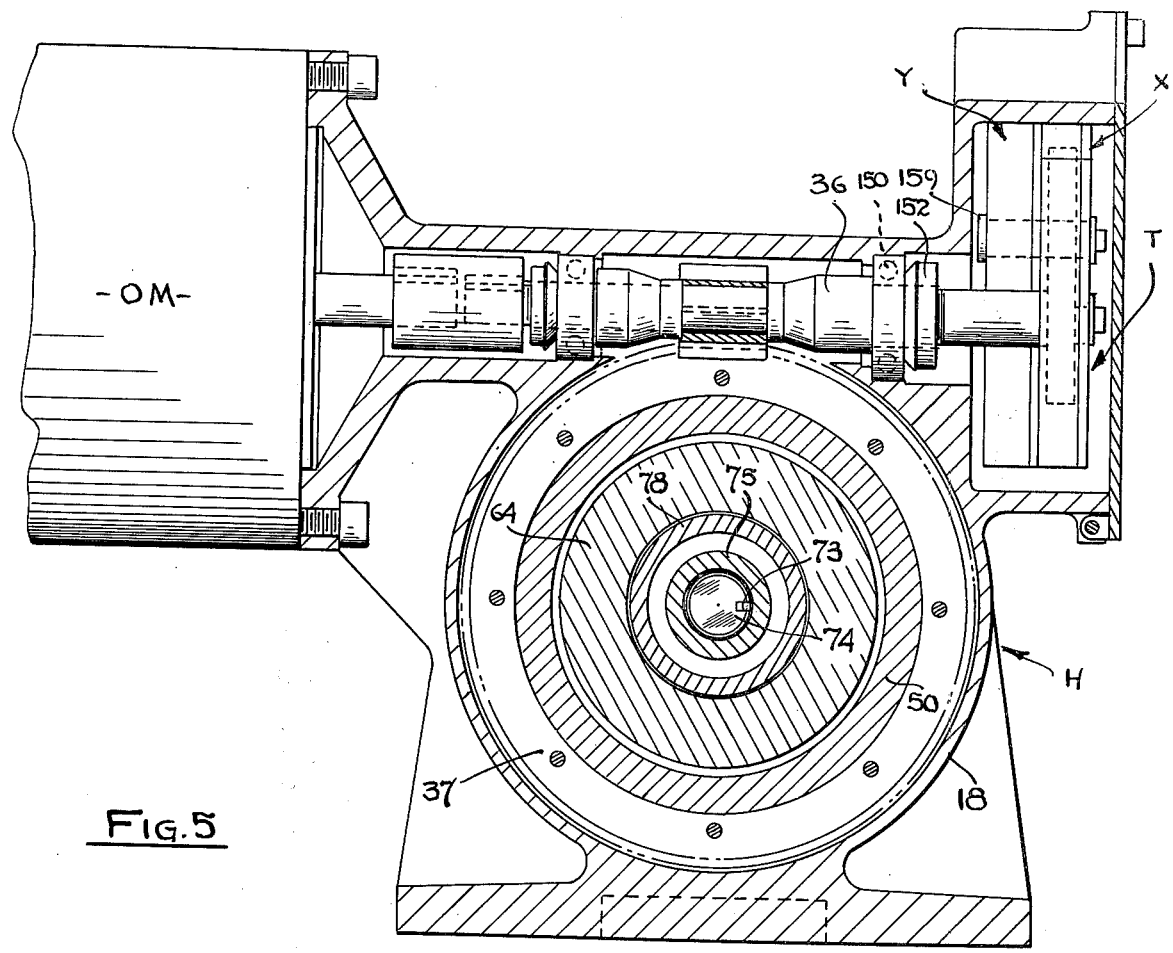
FIG. 5 is a transverse sectional view of the worm drive mechanism extending from the orbital drive motor, seen along the line 5—5 of FIG. 4, rotated 90° from the plane of FIG. 4.

Each worm shaft 36, 38 drives a respective ring gear 37, 39 (FIG. 4) each of which is carried by a tubular sleeve 50, 52 of the same circumference and axially spaced apart, being supported within respective annular guideways 51, 53 of the housing H by corresponding pairs of oppositely-slanted roller bearings 54, 55, 56, 57. The paired circles of bearings hold the rotary sleeves 50, 52 against axial displacement while permitting rotation of each sleeve in either direction.

An internally threaded lead nut 60 is centered transversely within the casing segment 16 and threadedly engages a composite guide tube 62. The latter is formed of a pair of concentric shells held together by a coaxial circle of bolts 59. The guide tube rotatably surrounds a restricted partially-conic end of an elongated hanger member or carrier tube 64 by means of ball bearing assemblies 65, 66. By means of splines or keys 67 disposed in axial keyways 68, the hanger tube is rotatable by the drive sleeve 50 and is also longitudinally displaceable relative thereto. The hanger tube is also restrained from lengthwise separation from the guide tube 62 by the lock nut 63 at one end and by a frustro-conic abutment shoulder 61 at its opposite end. From the shoulder 61, a spline or key 69 is projected into an axial keyway 70 of the uppersleeve 52. Rotation of the sleeve 52 (by ring gear 39 and worm 38) thus simultaneously rotates the guide tube 62 which by its threaded engagement with the stationary lead nut 60 is caused to move axially, and by such movement draws or pushes the hanger tube 64 with it in the same longitudinal direction; at the same time, the hanger tube is being rotated by the sleeve 50 (driven by the ring gear 37 and worm 36). Since rotation of the second sleeve 50 effects planetary movement of the distal rotary cutter F, and rotation of the first sleeve 52 effects axial displacement of the drive spindle of the cutter, simultaneous rotation of both sleeves carries the rotary cutter in a helical path, as hereafter detailed.

The main length of the drive spindle S is formed with a radially diminished neck portion 74 which is spacedly disposed within a larger axial cavity 71 (FIG. 4) of the hanger tube 64. Within the cavity, the neck 74 is supported by an elongated bearing assembly including a bearing tube 75. A spacedly surrounding support tube 78 is fixedly mounted as a cavity liner, with the inner tube 75 anchored by a spline 76 and lock nut 77, and separated from the outer tube 78 by a pair of ball bearing assemblies 80, 81. The whole is secured to the hanger 64 by a circle of bolts 79 inserted through a flange of the tube 78. The bearing assembly (75-81) and the body of the hanger 64 are thus movable as a unit lengthwise along the keyway 73 as the guide tube 62 is rotated within the lead nut 60.

The projecting end of the spindle neck 74 is threaded at 82 (FIG. 9) to receive a lock nut 83 and dished washer 84. Its stem 85 carries a spurgear 86 and distally thereto the threaded end carries a lock nut 88 and dished washer 89 and is located in a cavity 90 of an annular plate 91 by means of a ball bearing assembly 87. The annular plate 91 is fixedly retained in a cylindrical seating groove 92 of the hollow end of the hanger tube 64, and held against axial displacement by a circle of positioning screws 93 having reduced, cylindrical ends 94 extended into an annular, radially-open groove 95 of the plate. The latter is formed with an offcenter, dependent, cylindrical collar 96 (FIG. 12), the bore of which is continuous with an aperture extending through the overlying plate thickness. Such aperture is traversed by a stub shaft 97 carrying a pair of idler gears, of which the upper one 98 (FIG. 10A) engages the spindle gear 86, and the lower one 99 engages the end gear 100 of a spindle extension shaft S1. The latter (FIG. 9) is located in a housing tube 101 and journalled between an axially spaced pair of ball bearing assemblies 102, 103, within an outer tubular housing 104.

Proximately, the reduced upper end of the stub shaft S1 is threaded at two lengths on opposite sides of the spur gear 100 to receive lock nuts 107, 109, and corresponding washers 108, 110. The threaded end of the shaft with its nut 107 is received within a cylindrical tube 118 below the plate 91 and laterally supported therein by a ball bearing assembly 112.

In assembly, the shift fitting or stirrup 114 of FIG. 13 carries the end of a stub shaft S1 journalled in bearings 102 (FIG. 9) and is disposed beneath the annular plate 91 of FIG. 12 with the collar 96 rotatably housed within the cylindrical aperture 115 and retained by a radial pin 116 inserted through an arcuate limit-slot 117. Lenth of the pin-holding slot thus determines or limits the extent to which the stirrup, swung about the axis of its bore 115, can be partially rotated about the embraced collar 96 as the parallel channel or tube 118 is swung about the same axis.

Figure 9:
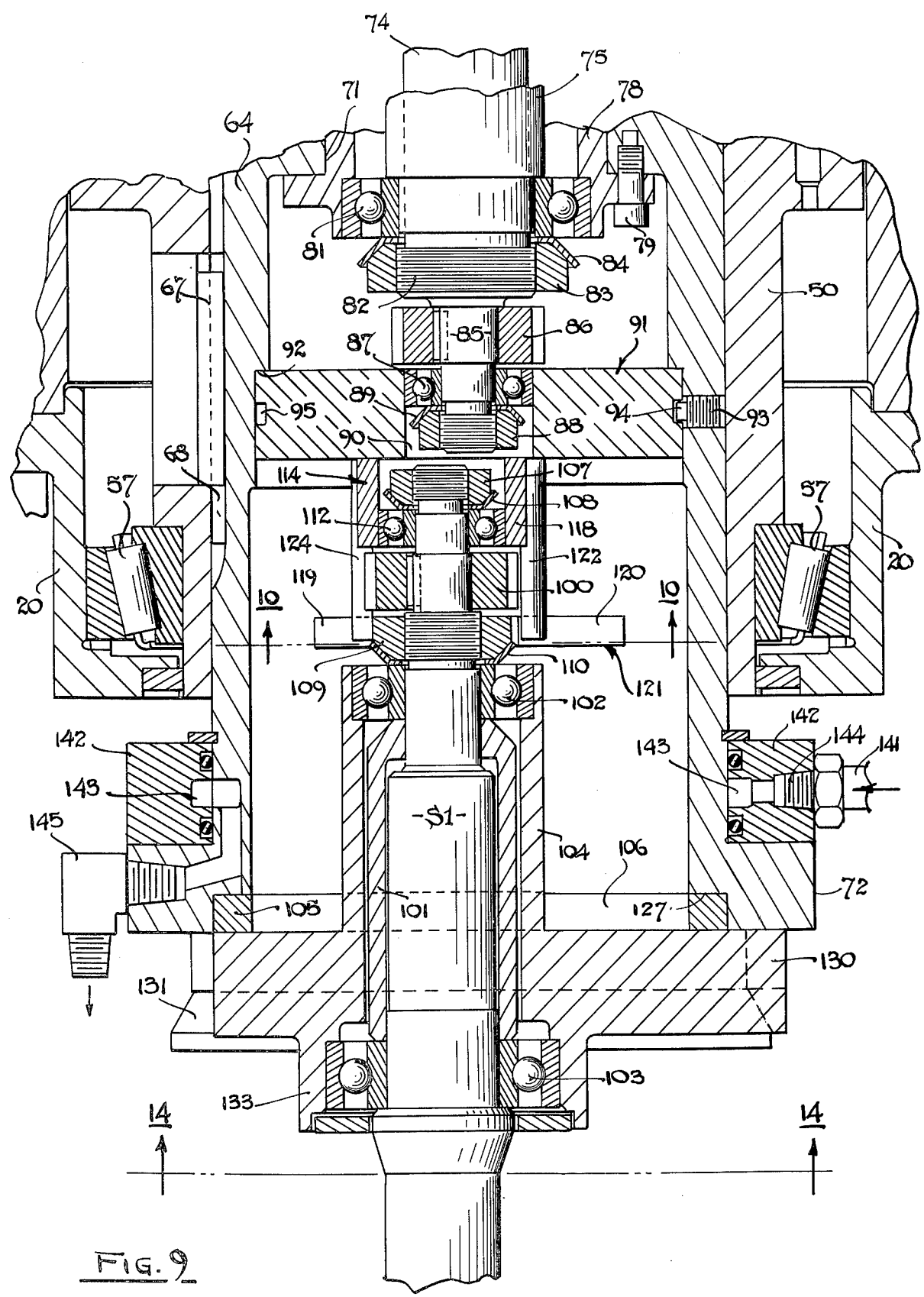
FIG. 9 is an enlarged longitudinal sectional view, partly in elevation, of the lower portion of FIG. 4.

A non-rotatable guide disk 105 (FIG. 11) is formed with a transverse aperture 106 through which the housing tube 104 is inserted. The annular rim of the disk 105 is seated in an inner groove 127 of the hanger tube 64. In line with a transverse edge of aperture 106 and axially spaced therefrom is an insert segment 121 formed with radially diverging or fanwise-directed cam faces 119, 120, and fastened to the hanger wall 64 by screws 111, 113 (FIG. 10). The stirrup 114 is formed with a pair of transversely separated legs 122, 124 of which one longitudinal edge 123, 125 of each is transversely curved or bowed. In operation, the lower lengths of the curved faces slidingly abut the respective cam faces 119, 120 with the end face 126 of the stirrup disposed generally parallel and spaced above the end face of the cam insert 121 by the height of the spur gear 100 (FIG. 9).

Figure 14:
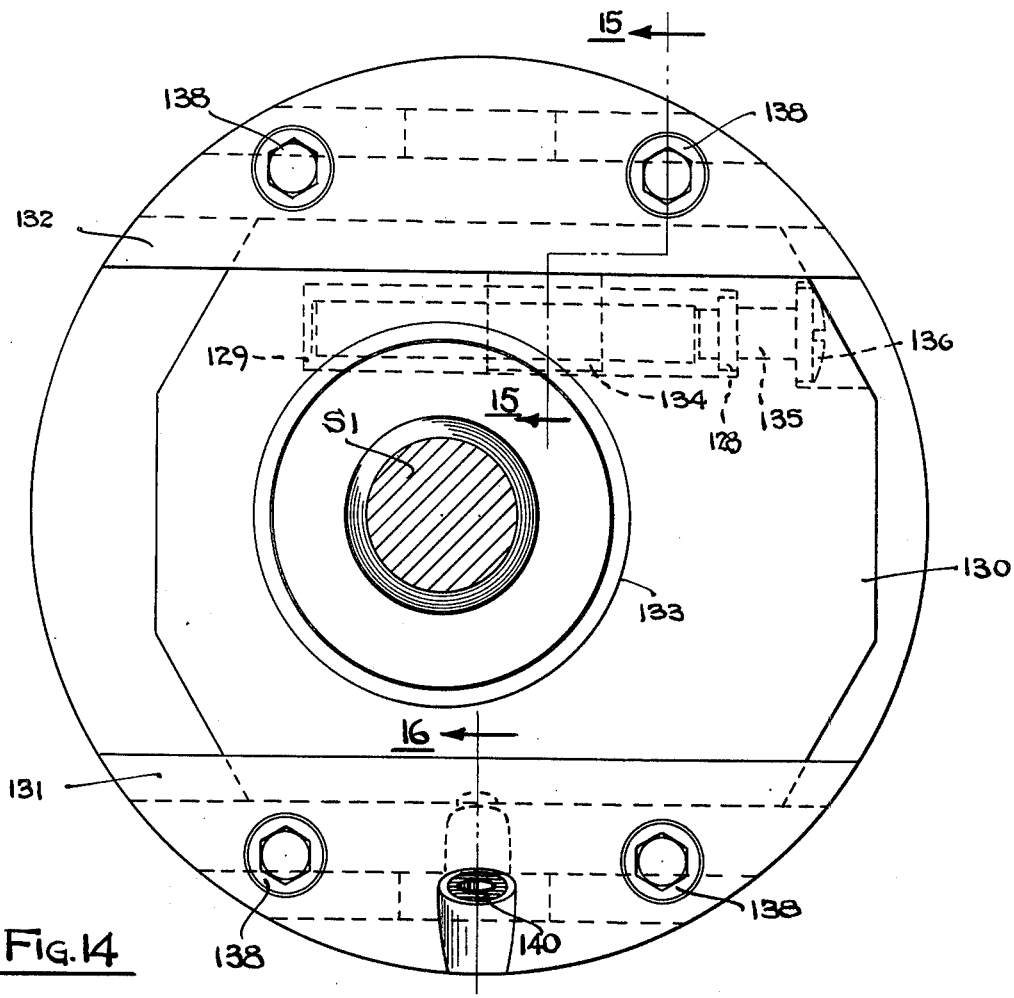
FIG. 14 is a sectional view along line 14—14 of FIG. 9.

It will be seen that when the stirrup tube 118 (journalling the end of stub shaft S1) is centered beneath the plate aperture 90, the stub shaft S1 will be coaxial with the main spindle S, 74. When the stirrup 114 is turned to the one side or the other about the collar 96, the (continuously driven) stub shaft accordingly will be swung laterally to a corresponding eccentric or offset position (FIG. 10) which serves to extend or retract the radial support/segment arm R (FIGS. 17-18) of the planetary cutter. Primarily this is effected by a transverse positioning block 130 from which the outer housing tube 104 is upstanding, the block being lengthwise slidable along an opposing pair of parallel guideways 131, 132 (FIGS. 14).

Figure 15:
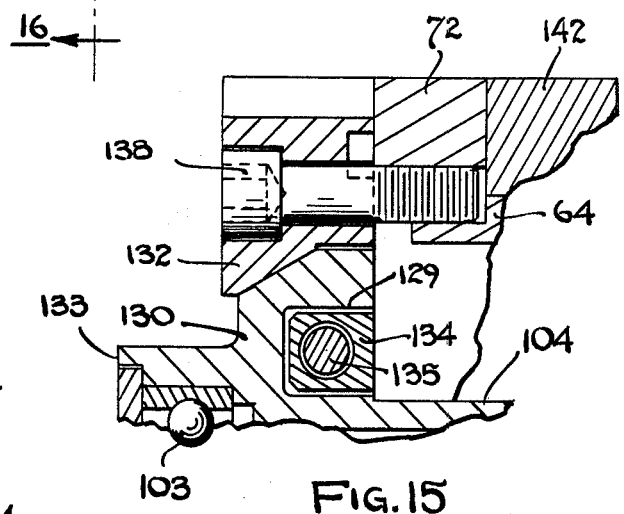
FIGS. 15 and 16 are detail views taken along the respective lines 15—15 and 16—16 of FIG. 14.
Figure 16:
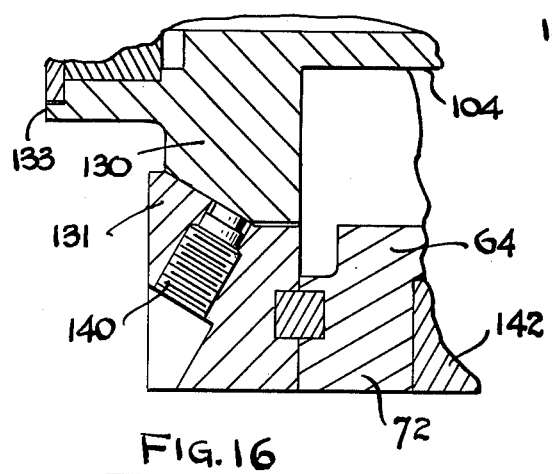

The generally rectangular slide block 130 is apertured in line with the housing axis H and is formed with a dependent annular boss 133 serving to house the ball bearing assembly 103 which journals the stubshaft S1. Along the upperface of the slide block is a longitudinally directed channel 129 is which an internally threaded tube 134 (FIGS. 14-15) is suspended, being threadedly traversed lengthwise by a positioning screw 135 anchored by a collar 128 to the slide block. A slotted head 136 of the screw is accessible to a tool such as a screwdriver for manipulation of the screw in one direction or the other so as to move the slide block lengthwise and thus shift the shaft S1 between coaxial and offset positions along the channel 131-2; at the same time the end of the shaft which is held in the stirrup channel 118 by the bearing assembly 112, correspondingly rotates the stirrup 114 about the axis of channel 115. Since the slideways 131, 132 which support the slide block are secured to the end of the hanger tube 64 by fastening elements 138, it will be seen that any rotation of the hanger tube carries the (independently rotating) stub shaft S1, together with the radial arm R and rotary cutter F in the same arcuate/helical path, thus giving planetary movement to the cutter. The slideblock is anchored at its selected location by a lock or fastening screw 140 (FIG. 16).

Adjacent the terminal flange 72 of the hanger tube 64 is a rotatable ring 142 (FIG. 9) having at one side an inlet throat 144 for coupling thereto of a hose 141 carrying a stream or slurry of cutting fluid. After moving around the passage 143, such fluid passes through an outlet fixture 145 from which by a suitable nozzle or conduit (not shown) it is directed onto the work surface being cut.

The rotatable sleeves 52, 50 (which are integral with their respective ring gears 39, 37) are driven simultaneously by the orbital motor OM by means of a casette-contained gear train transmission T which removably connects the respective drive shafts 38, 36. As noted earlier, rotation of the hanger tube 64 by the sleeve 50 (keyed thereto by spline 67) imparts planetary motion to the distal cutter F. Axial displacement of the rotating hanger tube (resulting in a helical path given the cutter) is effected by the sleeve 52 which by key 69 rotates the guide tube 62 which is in threaded engagement with the lead nut 60; the resulting axial displacement of the guide tube is imparted to the pivotally attached hanger tube. If the hanger tube were rotated in unisom with the coupled guide tube, the pitch of the lead nut would be reproduced by the cutter on the workpiece. However, by the present construction wherein the hanger tube is pivotally suspended axially from the guide tube, the pitch being cut is a function of the rate at which the axially moving hanger is being rotated (by the sleeve 50); hence the pitch is the composite result of the two movements, that is, it is determined by the velocity ratio of the two ring-gear drive shafts 36, 38. When these two are operated in tandem (one driving the other, or both being operated from a common drive shaft) the thread pitch being cut is set by the velocity ratio of the pair of sleeves 50, 52 (or of their drive shafts 36, 38 when the sleeves or ring gears are coaxial and of the same circumference). Hence a desired pitch can be obtained by connecting the two drive shafts 36, 38 with a gear train having the required mechanical advantage. A different pitch is obtained merely by substituting a cartridge or housing casette which carries a gear train having a different mechanical advantage. By the present construction this is simply effected by locating the two drive shafts mutually parallel and projecting their respective ends transverse to the tubular housing so that ready attachment can be made to the shaft ends by the end gears of the detachable gear train.

Figure 8:
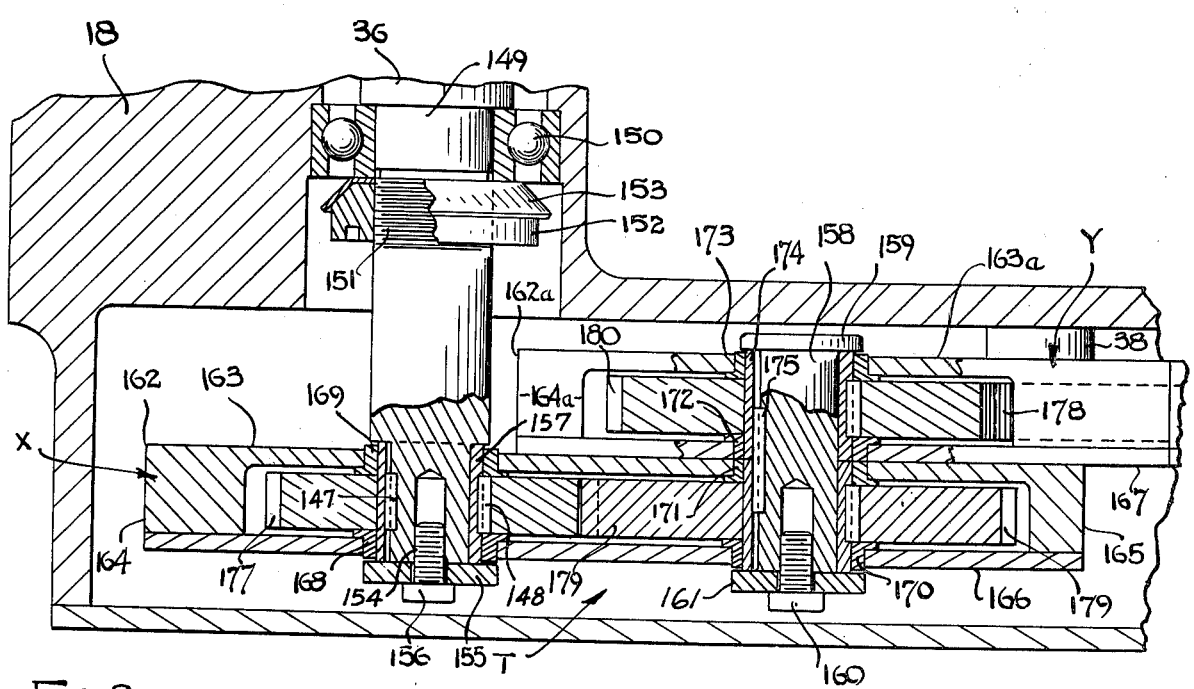
FIG. 8 is a sectional view taken through the gear train cassette along the line 8—8 of FIG. 6.
Figure 6:
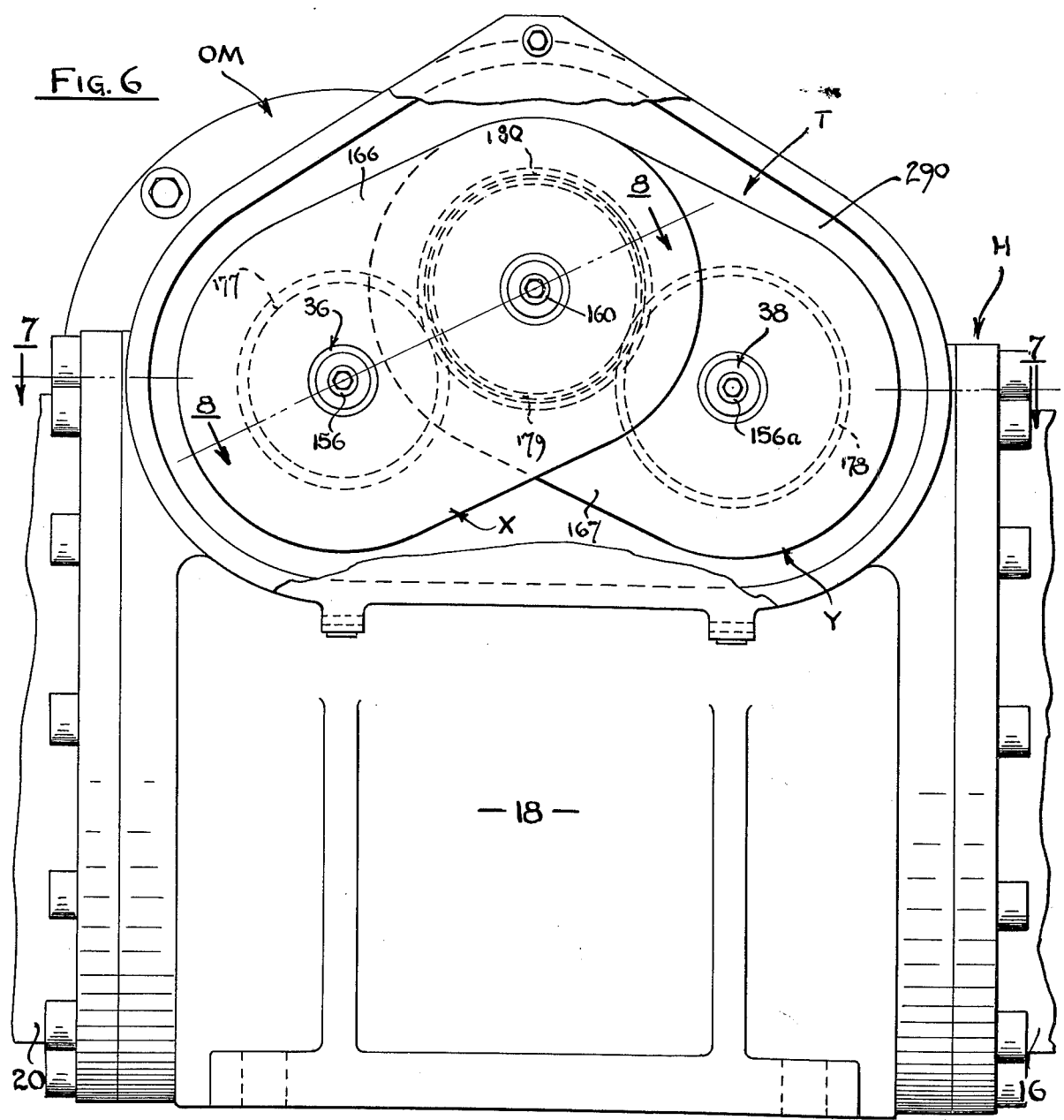
FIG. 6 is an enlarged elevational view, partly broken away, of the transmission gear train cassette and adjacent structure, rotated 90° to the right along the plane of the drawing of FIG. 1.
Figure 7:
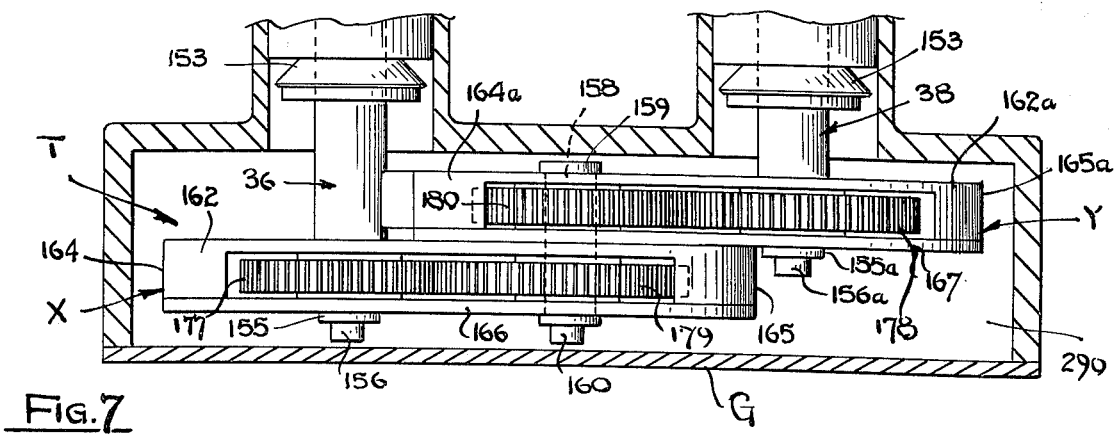
FIG. 7 is a sectional view taken through the gear train cassette along the line 7—7 of FIG. 6.

As seen particularly in FIGS. 7 & 8, the reduced end 149 of each worm shaft 36, 38 is located in a ball bearing assembly 150 adjacent to a threaded length 151 of the shaft which also carried a lock nut 152 and washer 153. A terminal axial cavity 154 is threaded to receive a retainer bolt 156 carrying a washer 155, the inserted end of the worm shaft carrying a bushing collar 157 which is keyed to the shaft by an inner spline 147 and to the spur gear 177 by an outer spline 148. The latter serves to attach a housing cassette T to the rotatable shaft 36; the other end of the casette is similarly attached to the parallel shaft 38.

The housing casette T is constructed of two similar segments X, Y, in planar registration, longitudinally staggered and fastened together by insertion of a rotatable shaft 158 having a flanged head 159 at one end and internally receiving a retainer bolt 160 inserted through washer 161 from the other end. Each gear housing segment X, Y is formed of two detachable parts, (a) an open-sided flat-bottom tray 162, 162a with respective end walls 164, 165 (164a, 165a); (b) the tray is covered by a removable or hinged panel or face plate 166, 167, spaced outward from the respective bottom wall 163 or 163a. Each of the segments X, Y are transversely apertured at two locations, each of which wall apertures carries a (bronze) bushing 168, 169, 170, 171, 172, 173. One aperture of each housing segment is axially aligned with the other (the bushings 171 and 172 disposed in end abutment) so as to receive jointly therethrough, the positioning shaft 158 and a bearing sleeve 174 which is keyed thereto by a spline 175.

Each of the drive shafts 36, 38 has its end inserted through a pair of bushings (168, 169 in the case of the shaft 36) and the intermediate length of the shaft is keyed at 148 to a spur gear 177 or 178 which gear is located within its respective housing segment X or Y. Between these two gears, the shaft 158 serves as an idler shaft and carries a pair of intermediate gears 179, 180, which engage respective gears 177 and 178. Accordingly the velocity ratio of the two rotating shafts 36, 38 is that given them by the attached gear train 177, 179, 180, 178. The assortment of gears in the train may be changed simply by removing and inserting different gears in the casette T. However, more practical, a series of such casettes are provided, each having a different gear assembly, that is, with a different mechanical advantage. Hence in changing to a different thread pitch for another job, it is necessary only to remove the installed casette and replace it with another which will produce the desired pitch. Alternately, a casette can be removed and inverted end for end, and then remounted to give a reversed mechanical advantage.

By use of the modification of FIGS. 30-32, while a gear train cassette remains in place at the end of the two ring gear drive shafts 36, 38, it is possible to temporarily disconnect one of the drive shafts (36) from its particular cassette-gear (177) so that (a) the motor OM then drives only the shaft 36, ring gear 37, sleeve 50 and the hanger 64 so as to rotate the planetary cutter F solely in an annular path, or (b) with the motor stopped, the disengaged (annular) drive shaft 36 may be reset by less than a full turn (say 90° or 120°) from the starting position of the previous helical cut, so that from this new starting position another (parallel and arcuately displaced) helical cut may be made (after reengagement of the drive shaft 36 and terminal gear 177). Thus several multi-start threads may be cut in a bore (or external to a cylinder), such as four threads each spaced apart by 90°, or three each spaced apart 120°.

The closure panel G1 of the cassette-housing chamber 290, for such modification, is apertured in line with the axis of the drive shaft and with the corresponding terminal gear (177) of the gear train. The panel wall is formed with an annular boss 291 which embraces a bushing 292 and a bearing collar 293. The terminal length 294 of the drive shaft is formed axially hollow (289) and open-ended, being externally supported adjacent the cassette housing chamber 290 by a ball bearing assembly 295 and lock nut 296. There is a lengthwise reciprocable, coaxial, multi-splined, coupling element or clutch 299 having a peripheral pattern of longitudinal splines a, b, c, as seen in FIG. 31, by means of which it is axially slidable or displaceable along corresponding internal grooves of a gear-support collar 297 and aligning or matched grooves of the hollow shaft 294. The grooved collar 297 forms the hub of the terminal gear 177 of the cassettte gear train, and its inner, annular end face 298 is disposed in aligned abutment with the outer end of the hollow drive shaft 294. When the splines of the coupling element 299 are engaged both with the hollow drive shaft 294 and with the gear collar 297, as seen in FIG. 30, the drive shaft 36 and the cassette gear train are clutched in driving engagement.

The innermost segment 308 of the coupling element 299 abuts a compression spring 310, the coupler being retained in the axial cavity 289 of the drive shaft 294 by a diametric pin 307 which traverses the surrounding drive shaft and therebetween rides in an axial slot 309 formed in the encircled coupling element. The axial length of the slot 309 thus marks the limit of the possible lengthwise displacement of the coupling element, that is, between (outer) shaft-gear engagement position, and (inner) gear disengagement position. The spring 310 normally holds the coupling element 299 in "outer" or gear-engagement position.

The outer end of the coupling element 299 is formed with an outward-open engagement slot 300 diametrically directed to receive a corresponding tang 301 of an actuating shaft 302. The latter has a laterally-projecting coupling pin 304 and terminally carries a circumferential hand-knob 303. The tang end of the shaft is partway-inserted in the bearing collar 293 and releasably retained by a spring-pressed detent ball 305 which is located in transverse alignment with an arcuate-extending radial socket 306 which receives the pin 304. Accordingly, the mounted cassette gear train (and particularly the terminal drive gear 177) may be disengaged from the drive shaft 36 without dislodging the gear train or cassette, simply by (manually) axially depressing the knob 303 and shaft 302. With such movement, the latch pin 304 moves down an entry passage 311 and (upon a small turn of the shaft) lodges in the socket 306.

Such axial thrust of the shaft 302 moves the splined coupling element 299 along its grooved channel of the drive tube 294 until the splines a, b, c, slide beyond the axial sleeve 297 of the gear. The manual operating shaft 302 is then locked to the drive shaft 36 of the orbital motor OM and the latter (with the gear train disengaged) can move the cutter F or work-contact element solely in an annular (planetary) path. Alternately, with the motor stopped, the operator can reset the drive shaft 36 by manipulating the knob 303. Corresponding manual shaft 302a of FIG. 32 is provided with a crank handle 315 for such purpose, and an annular scale calibrated in degrees of arc 314 is alignable with a position indicia 312 carried by panel face G1 adjacent the turret 291.

FIGS. 25-28 show a modified construction by which the cutter head may be rapidly withdrawn radially (rather than by slow unscrewing) from its contact with the work surface, as at the end of thread formation, so that the milling assembly and cutting head as a unit can then be easily separated axially from the workpiece bore. With this construction, the anchorage collar 128 of FIG. 14 is omitted and the locking screw 140 is not used. The slide block 130a and its longitudinal slideways 131a, 132a are suspended by bolts 138a, the upper heads of which are held by bifurcate arms 211, 212 of respective bell cranks 213, 214, which are pivotally attached to dependent brackets 215, 216. The overlying structure 105a is formed with a cylindrical fluid cavity 220 connected by conduits 221, 222 to more distant operating pump and valve means (not shown). within the cavity 220 is a piston 223, the dependent stem 224 of which extends through an open space 225 and is terminally pivoted to the arms 226, 227 of a toggle coupling, the outer ends of which are connected to the respective bell cranks at pivot points 228, 229.

Figure 25:
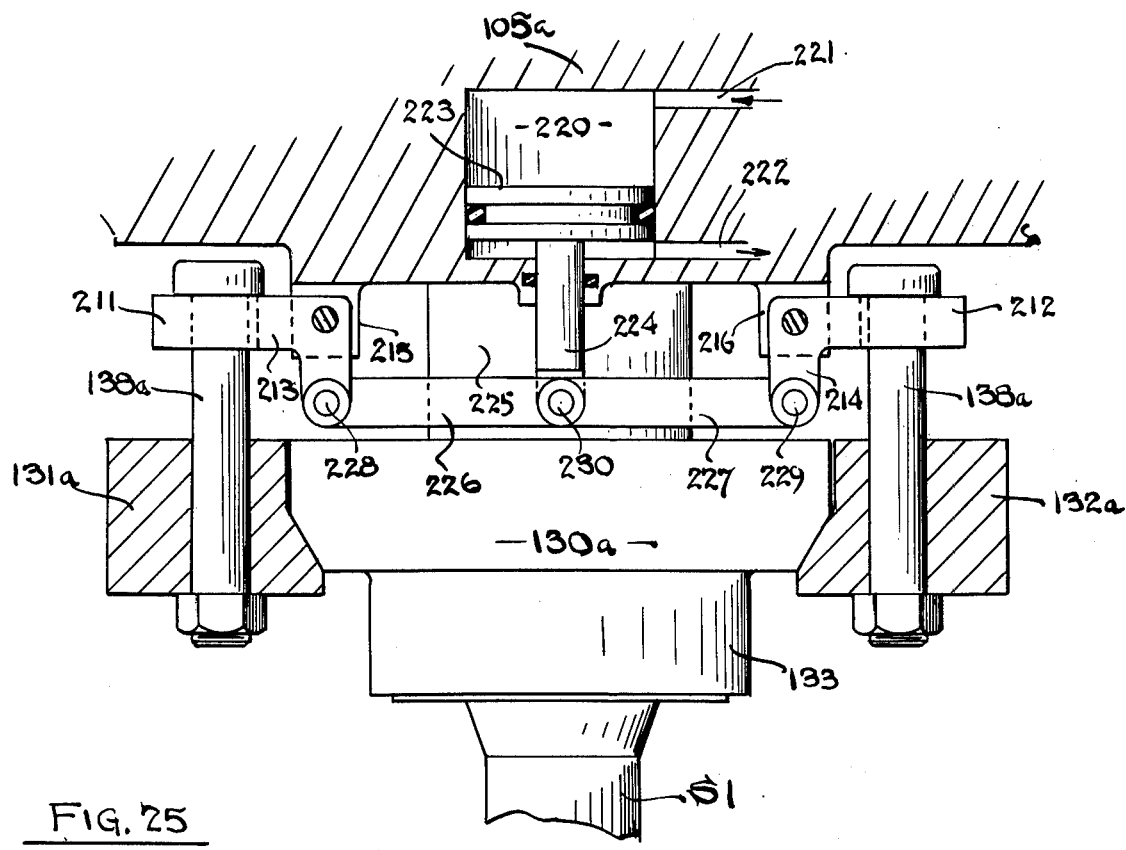
FIGS. 25 and 26 are sectional-elevational views of the structure immediately adjacent the slide block which radially positions the cutting head, and particularly showing a remote fluid-operated anchorage unit for the block, seen respectively in lock and release positions.
Figure 26:
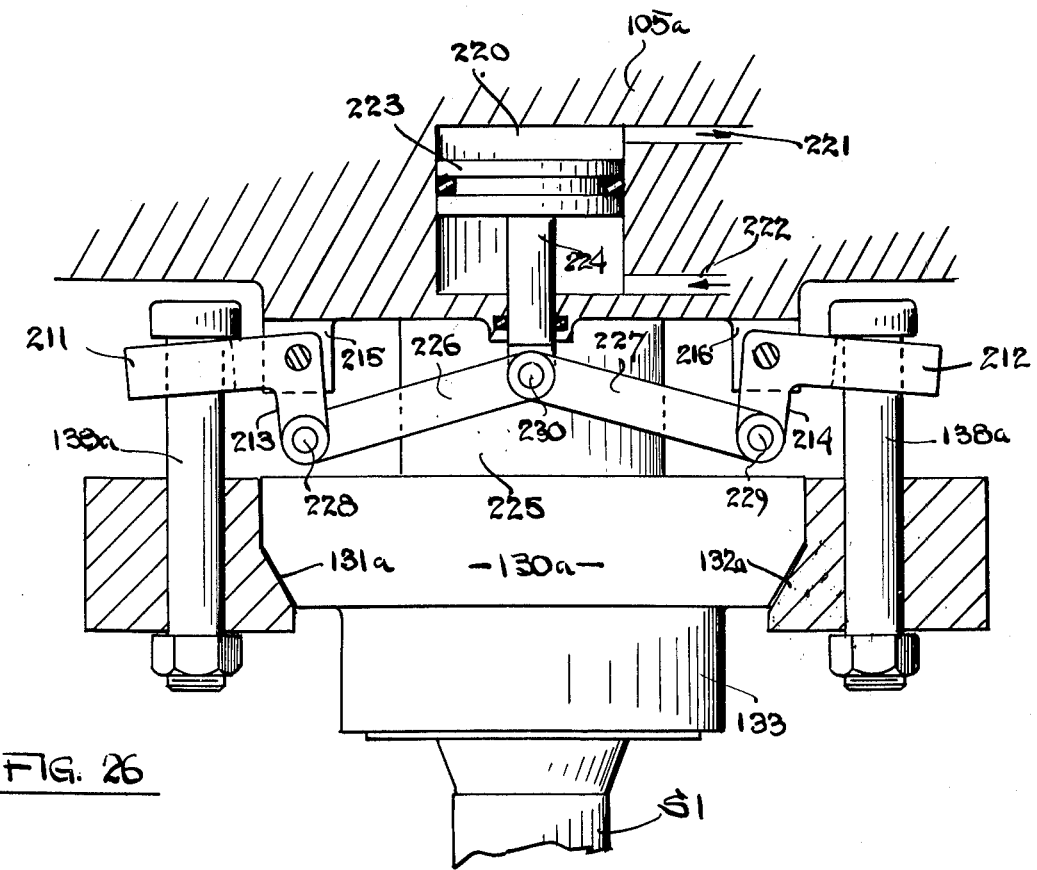

When the piston 223 is held in the "down" position of FIG. 25 by fluid pressure exerted through line 221, the consequently transversely aligned toggle arms 226, 227 cause the suspension bolts 138a to clamp the slideways 131a, 132a tightly against the sides of the slide block 130a so that the latter will not move longitudinally along the slideway. Upon release of such fluid pressure and retraction of the piston 223 (FIG. 26), consequent reverse tilting of the suspension bolts causes the slideways 131a, 132a to "loosely" hold the slide block 130a and spindle S1 so that they can be moved to and away from the workface in the normal manner.

Figure 27:
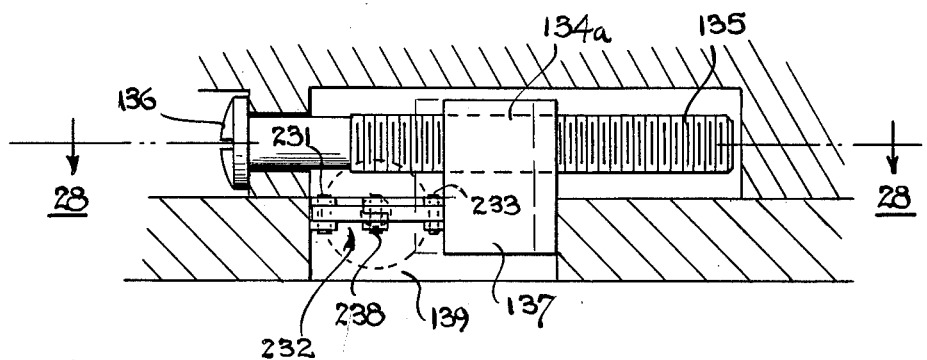
FIGS. 27 and 28 are sectional views through the structure adjacent the anchorage unit and positioning screw, the latter section taken at right angles to the former.
Figure 28:
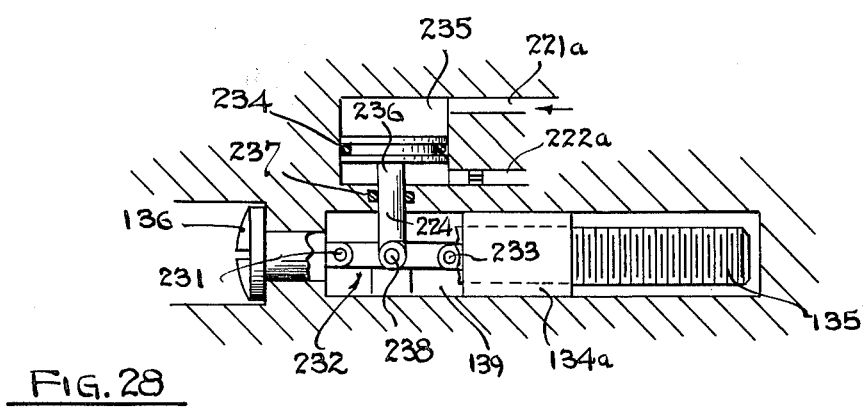

This result is possible by simultaneous operation of the modified mounting for the positioning screw 135 shown in FIGS. 27-28. The "fixed" nut 134a which is threadedly traversed by the positioning screw has a lateral extension 137 of the threaded body received in a limited guideway or channel 139, which space also contains a toggle coupling 232 anchored to an end wall of the channel by pivot 231 and to the nut body by pivot shaft 233. A piston 234 is housed in an overlying chamber 235, connected by operating fluid lines 221a and 222a. Piston rod 236 projects through an annular seal 237 into the space 139 where it is joined to the toggle arms by pivot connection 238. Accordingly, when the piston 234 is in the depressed position of FIG. 28, the threaded block 137 is held at the end of the channel 139 as seen in FIG. 27. The slide block 130a can then be set at its desired position by manipulation of the screw 135. However, upon retraction of the piston 234 (by fluid pressure through line 222a concurrent with pressure applied through line 222 of FIGS. 25-26), the nut housing 137 with its carried screw 135 is moved lengthwise to the left, thus allowing the slide block 130a to be retracted along its loosened guideway 131a, 132a.

Typically — before inserting the cutter head in an aligned work bore—with the threaded housing 134a in its anchored position, the position screw 135 is preset so as to locate the slide block 130a with its carried spindle S1 and cutter extended the amount necessary to make work-contact or bore-contact. The carried screw and threaded housing 134a are then retracted lengthwise in the channel by action of the piston 234, to the location indicated by broken lines in FIG. 27; the slide block 130a is locked in its slide channel by action of the piston 223, and the cutter head is inserted in the bore of the workpiece; the cutter is then extracted to bore-contact by action of the piston 234. Before withdrawal from the bore, the cutter may be (radially) retracted simply by action of the piston 234; or both pistons may be activated. In the latter case, with the slidable positioning member 130a "loose", the spindle is further retracted by opposite movement of the housing H.

Figure 29:
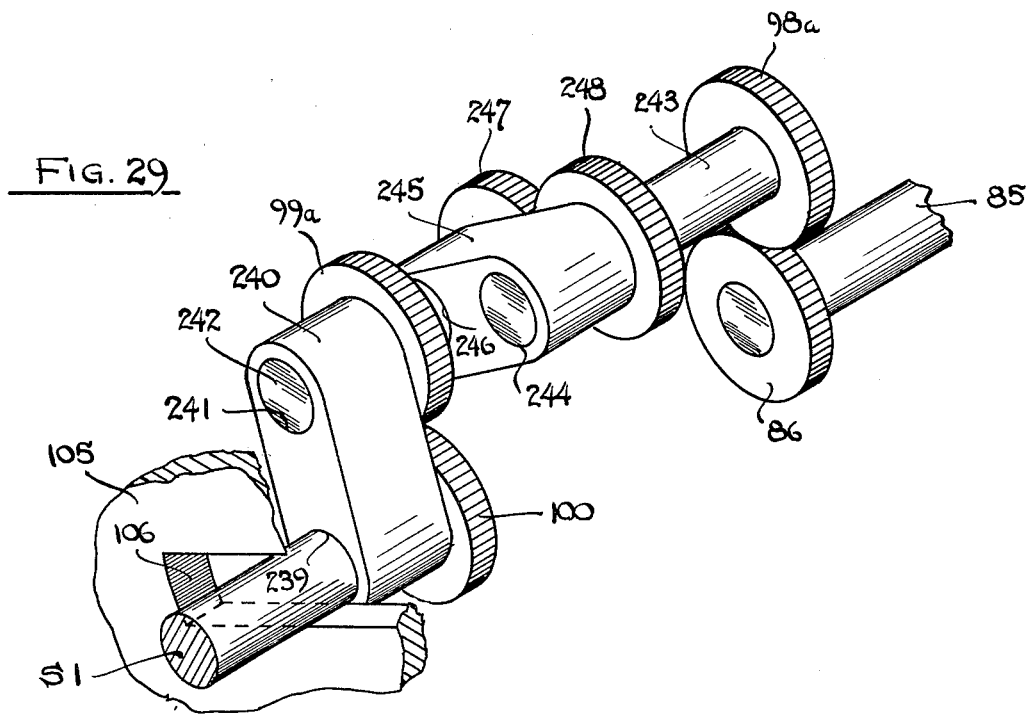
FIG. 29 is a perspective view of an alternate construction used to couple the drive spindle and offset portion instead of that of FIGS. 9-13.

FIG. 29 illustrates a modification of the offcenter-shiftable drive coupling arrangement of FIGS. 10-13. With the spindle extension S1 projecting up through the transverse aperture 106 of the guideplate 105 (FIG. 11A), its shaft portion which is directly above the plate surface and immediately adjacent (beneath) the end gear 100 of S1 is journalled in an aperture 239 of a dual-aperture bearing coupling 240, the parallel aperture 241 of which journals a stub shaft 242. The latter disposes an idler gear 99a in engagement with the gear 100. The spur gear 86 of the main spindle 74 engages an idler gear 98a which is carried by a stub shaft 243, the other end of which shaft is journalled in an aperture 244 of another dual-aperture bearing coupling 245. The other aperture 246 is traversed by the stub shaft 242 which above the coupling 245 carries an idler gear 247 in mesh with an idler gear 248 of the shaft 243. In comparison with the construction of FIG. 10A, an additional pair of idlers 247, 248 has been inserted between the gears 87 and 100, in order to insert the free-floating pair of dual coupling collars 240, 245 in the drive train; variable positioning of the collars enables a selected location of the take-off shaft S1 to be obtained relative to the axial spindle or drive shaft 74, without recourse to more complicated shift mechanism. That is, the longitudinally displaceable drive shafts S, 74 is held coaxial by the hanger 64 and its tubular housing H, and the take-off shaft S1 is positioned at the desired off-center location by transverse shift of its slide block 130. During such shift, the intermediate gearage (between 86 and 100—FIG. 29) automatically accommodates or self-aligns by means of the pair of dual linkage bearing collars 240, 245, which are otherwise unsupported or "free-floating".

FIGS. 23-24 show a modification by which a spiral thread pattern of a desired pitch may be formed around a conic bore or projection. Essentially the work shaft 36 (FIG. 4) which drives the sleeve 50 and ring gear 37, is also drivingly connected [by the present auxilliary attachment K] to the positioning screw 135a which progressively radially moves the slide block 130 and its carried spindle S1 and cutting head. In conjunction with axial displacement of the spindle S1 and cutter effected by the worm shaft 36 and hanger 64, the planetary cutter forms a helical groove of which successive spirals are of increasing or decreasing diameter, thus conforming to a conic work surface.

A two-segment housing 250, 252 is secured to or made integral with the respective main housing segment 18 and the terminal projection of the hanger tube 64, by means of an attachment plate 254. Within the upper housing segment 250 is a stub shaft 256 journalled in ball bearing assemblies 257, 258, and carrying a spur gear 259 which engages a drive gear 260 of the worm shaft 36. One end of the shaft 256 disposes a bevel gear 261 in mesh with a bevel gear 262 terminally carried on a longitudinal shaft 263 which is journalled in bearing assemblies 264, 265. The distal length of shaft 263 is hollow and houses a longitudinally slidable take-off shaft 266 keyed thereto at 267 for joint rotation. The extensible shaft 266 is journalled in a bearing assembly 268 through which it enters the housing segment 252 and disposes a bevel gear 269 in mesh with another bevel gear 270 of an ultimate drive shaft 271 which is coupled to the positioning screw 135a and journalled in bearing assemblies 272, 273.

FIGS. 21 and 22 show different possible rearrangements of housing or assembly components which may be used in order to facilitate attachment of the thread milling assembly to typical support and operating units already present in a machine shop, in place of utilizing the magnetic base B shown in FIG. 1. In FIG. 22 the lateral attachment bracket 29 of the housing tower H is bolted to an upright support unit Z, such as a Bridgeport Ram. Modification includes the spindle motor SM relocated upstanding from a transverse housing 35, which latter contains the gear reduction unit. The uppermost housing segment 14 of FIG. 1 may be omitted and the adjacent segment 16a is formed somewhat shorter in this instance when the internal mechanism is designed only to thread shallow bores; that is, the vertical offset-spindle S1 and its cutter travel only a short axial distance. The control console D1 likewise is changed to a connection to the principle housing segment 18a.

The construction of FIG. 21 is a similarly longitudinally shortened structure which additionally lacks its own spindle drive motor. To the top margin of the housing segment 18a is fastened a conic or bell housing 202 having a terminal flange plate 203 secured by bolts 204 to the underface of a rotary drive machine 205. The drive shaft 206 of the power machine is coupled to the main spindle S of the milling assembly by a safety coupling 207 employing a sheer pin 208 and manipulable through an aperture 209 of the housing cone.

Figure 19:
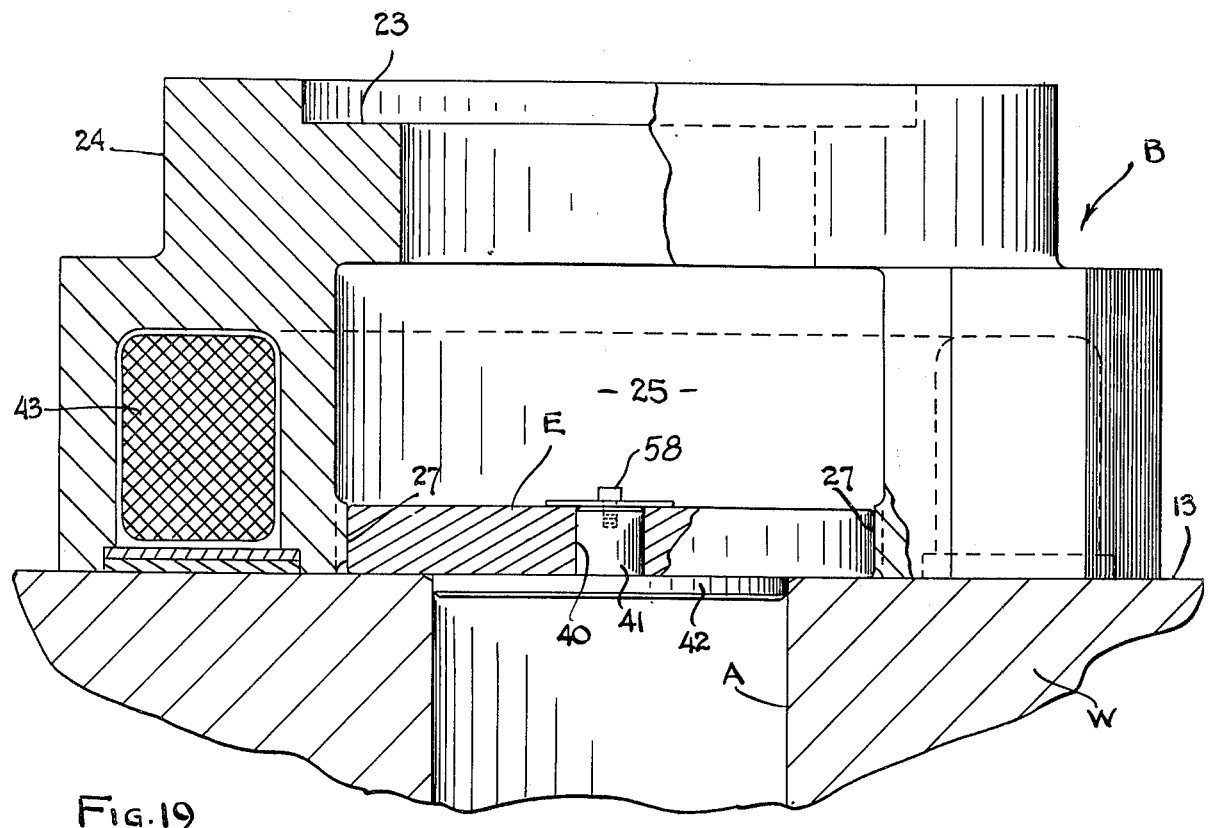
FIG. 19 is a transverse section, partly in elevation, taken through the electromagnetic base and the adjacent workpiece of FIG. 2, showing a bore locator plug in place.
Figure 20:
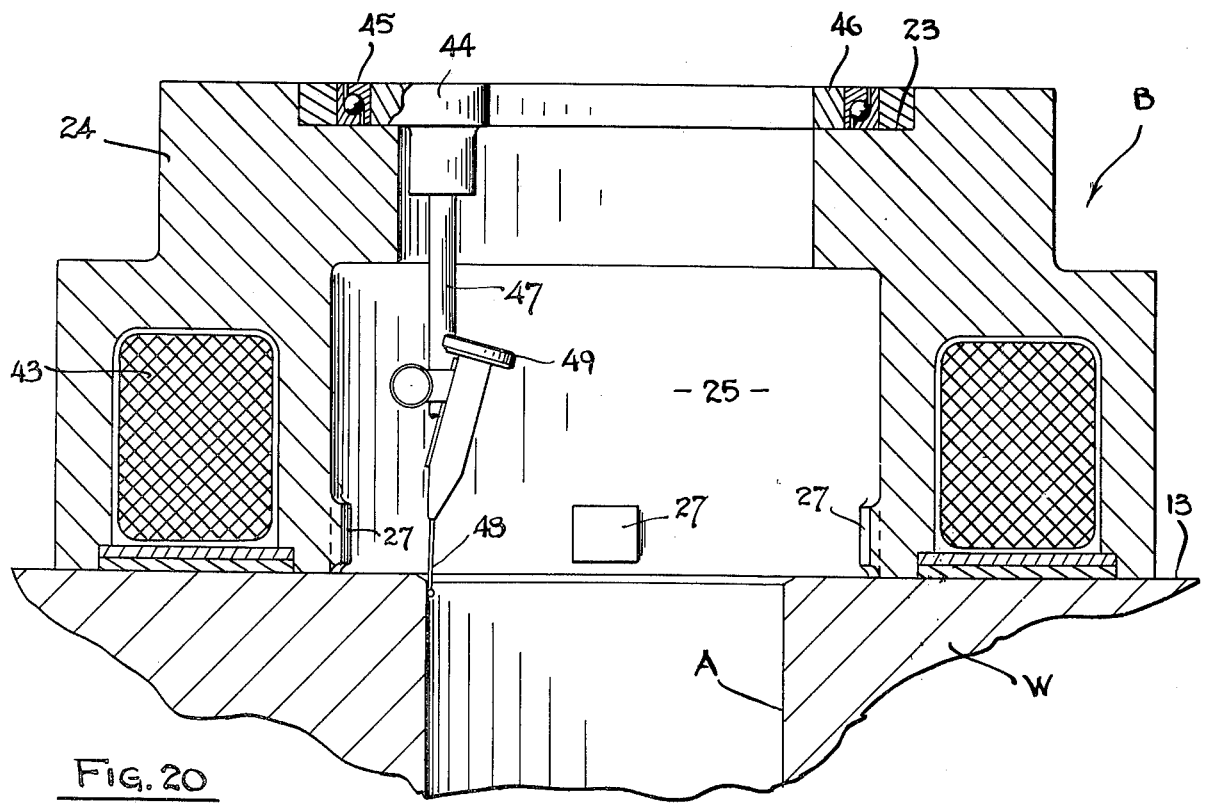
FIG. 20 is a similar view of FIG. 19 with the locator plug removed and a rotatable assembly carrying a bore contact probe and dial indicator mounted in the base in position to gage its coaxial centering relative to the bore of a workpiece.

In order to initially position the magnetic base B coaxially or centered about the mouth of a bore A of a (metallic) workpiece, there is provided an annular locator disc E (FIG. 19) having an axial aperture 40 and adapted to be retained at the bottom of the cavity 25 in edge-registration by means of inner flutes or ribs 27 of the cavity. An annular plug 42 is selected having a circumference insertable fittingly into the mouth of the bore A and it is temporarily mounted beneath the disk by pressing an axial stem 41 of the plug upward into the aperture 40 and securing the bolt 58. The base B with its sized plug 42 bottom-projecting therefrom can be moved along the work surface 12 along the dependent plug is fittingly pressed in the mouth of the bore A. Electric current is then caused to flow thrugh the solenoid coil 43 of the electromagnet so as to anchor the base to the workpiece in such position, and the disk E and its carried plug 42 are removed from the base B. There is then placed in the upper, annular turret ledge 23 a ring assembly 44 (FIG. 20) having a ball bearing raceway 45 which supports a rotatable inner ring or hoop 46 which has a dependent arm 47 supporting a radially adjustable bore contact probe 48 which through leverage activates a dial indicator 49. Accordingly, as the contact probe is moved about the inner circumference of the bore by rotating the ring 46, any deviation of the base from a coaxial alignment with the bore is readable on the indicator 49 and as a consequence, the precise location of the base can be compensatingly shifted or realigned. A series of sized or graduated plugs 42 corresponding to bores of different diameter are provided for such use.

Figure 33:
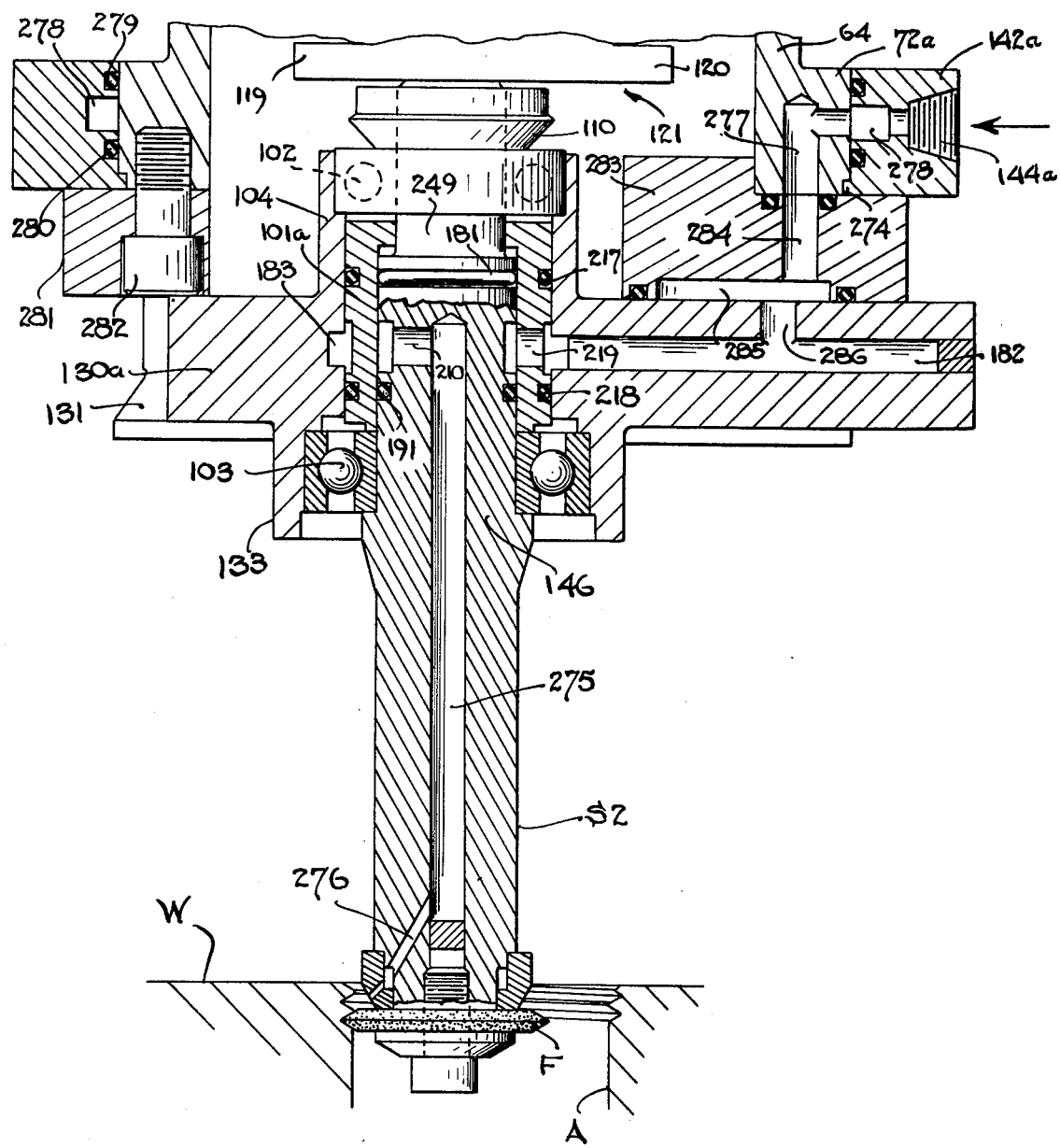
FIG. 33 is a longitudinal section of the spindle extension and lower portion of FIG. 9 showing a modification wherein the stream of cutting fluid is fed to the workface from a lengthwise bore of the spindle.

In the modification of FIG. 33, the stub shaft S2 is formed with a longitudinal fluid channel 275 having a distal, laterally-slanted outlet passage 276 directed toward the outer edge of the cutter F or against the surface of the bore A which is being milled or threaded. As before, a reduced neck portion 146 of the spindle extension is retained by a ball bearing assembly 103 within the annular boss 133 of the slide block 130a which latter is held displaceable along the parallel, transverse guideways 131, 132. Extending beyond the support collar 101a, a further reduced neck portion 249 of the spindle is supported in the ball bearing assembly 102, and within the collar carries a pair of sealing rings 181, 191. Outwardly the collar 101a carries another pair of sealing rings 217, 218. The slide block 130a is formed with a longitudinal fluid passage 182 terminating in an annular channel 183 which outwardly surrounds the support collar 101a and through a port 219 provides access to an inlet passage 210 of the fluid channel 275.

The end flange 72a of the hanger 64 is formed with an elbow channel 277 which at the inlet end is joined to an annular channel 278 of a rotatable annulus 142a having a hose coupling throat 144a, a positioning shoulder 274, and carrying a pair of sealing rings 279, 280 held in circumferential abutment with the hanger flange. Beneath the ring 142a is a ring-like structure 281 secured to the hanger end by several bolts 282 and having a radially inward extending portion 283 which is formed with a fluid channel 284 aligned with the elbow 277 and distally opening to a radially-directed channel 285 which overlies a port 286 connecting the channel 182 of the slide block 130a. Thus, regardless of the rotational and axial position of the hanger 64 (and its carried cutter F), liquid or slurry entering the inlet throat 144a is in continuous fluid flow through the connecting passages to the outlet 276. The length of radial channel 285 accommodates the slide block 130a in whatever position it may be located along its slideway, so that the fluid flow is not interrupted by changing the radial extension of the cutter F.

In the modification of FIGS. 17–18, the slide block 130 and boss 133 dispose a short spindle extension S2 within an annular housing 184 of the radial support arm R, the spindle distally carrying a bevel gear 185. An inner partition or web 186 of the housing carries a bearing collar 187 which medially supports a stud shaft 188, at each end carrying a respective bevel gear 189, 190, the latter thus disposed in mesh with the first bevel gear 185. Within a bowl or half-shell housing structure 192 which projects outward from the radial arm R, another stud shaft 193 carries a bevel gear 194 in mesh with the gear 189 and also engaging a bevel gear 195 which is on the inner end of an outward projecting drive shaft S3 which terminally carries a milling cutter F2. The shaft S3 traverses a bearing sleeve 196 of a carrier 197 which together with a dished or half-shell cover plate 198 is retained by the housing, rotatable in a generally semi-annular path radiused from the center of shaft 193. The rotatable cover shell 198 is formed with a semi-circular slot 199 through which an anchorage bolt 200 projects from the fixed housing therebeneath, tightening of which bolt serves to fasten the carrier at a selected rotational position, which setting may be determined from a graduated alignment or indicia scale 201. Accordingly, the carrier is thus anchored by the bolt 200 at such position of the wedge-shaped cutter disk F2 as will produce the desired angle or groove-configuration on the workpiece W.

What is claimed is:

1. A rotary tracking machine for moving a work contact member along a conical surface of a workpiece comprising central drive means including a generally radially extensible arm carrying said work-contact member movable in a planetary path by said drive means, a pair of separately operable guidance elements for selectively positioning the work-contact member, one of which elements is adapted to guide the member annularly and the other to guide it axially and jointly the two elements being adapted to guide the member in a helical track at a predetermined pitch, gear train means adapted to operatively couple the pair of guidance elements and jointly drive them with a velocity ratio dependent upon the particular gearage of the gear train means, which ratio thus determines the pitch of the helical track followed by the work-contact member, and may be changed by substituting different gearage elements in said gear train means and thereby change said pitch, and means responsive to joint operation of the guidance elements for progressively changing the amount of radial extension of said arm, whereby the helical track followed by the work-contact member may conform to the conic surface of the workpiece.

2. A machine according to claim 1 which includes means for selectively engaging and disengaging said gear train means from one of said guidance elements whereby the work-contact member may be driven in a path determined primarily by the other guidance element.

3. A machine according to claim 1 wherein each of said guidance elements comprises a rotatable sleeve, and said radially extensible arm is carried by a hanger member which is drivingly engaged simultaneously by one guidance element for axial displacement and by the other guidance element for rotational movement.

4. A machine according to claim 1 wherein said work-contact member is a rotary milling cutter.

5. A machine according to claim 1 wherein said radially extensible arm is connected to a positioning screw for advancement toward a work surface, which positioning screw is threadedly retained by a support member secured to a portion of the machine by quick-release anchorage means, whereby upon remote activation thereof, the support member together with its positioning screw and connected arm are thrust-withdrawable so as to remove the work-contact member from a work surface without rearward rotation of the positioning screw.

6. A milling cutter for cutting helical threads on a stationary worksurface, comprising in combination:

a housing supporting a threaded lead nut transversely disposed relative to its longitudinal axis, a guide member axially disposed in threaded engagement with said lead nut and a hanger member pivotally connected to the guide member for free rotation about said axis and jointly longitudinally displaceable with the guide member therealong, first rotational means for turning the guide member relative to the lead nut, second rotational means for turning the hanger member independent of the connected guide member, whereby an offcenter point of the hanger member is movable in a helical path upon concurrent axial displacement, a generally radially disposed drive spindle extending from the hanger member and distally carrying a rotary milling cutter which is thus movable in a planetary path relative to said longitudinal axis, and drive coupling means adapted to operate each of said rotational means concurrently at speeds adapted to produce a selected pitch of the helical path and of the resultant thread cut therealong.

7. A milling cutter according to claim 6 wherein said rotatable spindle includes a rotatable drive shaft terminally carrying a drive gear, and a rotatable driven shaft longitudinally displaced from the terminal end and gear of the drive shaft and carrying a driven gear, shaft coupling means adapted for progressively shifting the driven shaft between positions coaxial and laterally displaced therefrom on either side of the drive shaft while maintaining continuous driving engagement between the drive shaft and the driven shaft, said means comprising an idler shaft carrying a pair of axially separated gears, each disposed in mesh with one of said shaft gears, a transverse plate, spacedly separating adjacent ends of the drive shaft and driven shaft, and providing bearing and socket means disposed adjacent one face thereof for rotatably supporting the end of the drive shaft, the plate having offset collar means dependently projecting from the opposite face thereof, said idler shaft transversing said plate and being axially journalled in said collar means, and a shift member formed with a cylindrical guide tube disposed rotatably concentric with said collar means and having bearing and socket means radially spaced therefrom and rotatably supporting the adjacent end of the driven shaft, whereby upon partial rotation of the shift member about the axis of said collar means, the driven shaft may be disposed coaxial with the drive shaft and alternately on either side thereof with the idler gears remaining in operative engagement with the respective shaft gears.

8. A milling cutter according to claim 6 which includes means responsive to axial displacement of the guide and hanger members for progressively changing the amount of radial extension of the milling cutter, whereby the helical cutter path may conform to the slope of a conic worksurface.

9. A milling cutter according to claim 6 wherein said rotatable spindle includes a rotatable drive shaft terminally carrying a drive gear and a rotatable driven shaft longitudinally displaced from the terminal end and gear of the drive shaft and carrying a driven gear, means for progressively shifting the driven shaft between positions coaxial and laterally displaced therefrom on either side of the drive shaft while maintaining continuous driving engagement between the drive shaft and the driven shaft, including coupling means for self-aligning and operatively connecting adjacent displaced ends of the respective drive shaft and driven shaft, said means comprising a pair of longitudinally staggered idler shafts each carrying a pair of axially separated gears collectively forming a gear train together with said drive gear and driven gear, said idler shafts being each journalled and held together, and the driven shaft and the adjacent idler shaft each being journalled and held together by respective dual-aperture free-floating, transverse, linkage collars whereby upon radial displacement of the driven shaft relative to the axis of the drive shaft, the driven shaft may be disposed coaxial with the drive shaft and alternately on either side thereof with the idler gears remaining in driving engagement with the respective shaft gears.

10. A milling cutter according to claim 6 wherein each of said rotational means comprises a ring gear and said drive means comprises a separate worm gear disposed in driving relation with a respective ring gear, and each of said worm gears is detachably connectable to a gear train of selected gearage which thus determines the velocity ratio of the guide member and hanger member.

11. A milling cutter according to claim 6 in combination with a separable electromagnetic, generally U-shaped support base having annular, rotatable, tactile gage means for aligning the same coaxially with the bore of a workpiece, whereby said tubular housing can then be located coaxial to said bore upon being placed adjacent thereto.

12. A combination according to claim 11 which includes a removable bore-sizing cylindrical insertion plug dependent from a peripherally enlarged support structure which is receivable coaxially within said base.

13. A milling cutter according to claim 6 wherein said generally radially extending drive spindle is carried by a slidable positioning member located in a binding slide channel formed by at least one transversely tiltable channel member, movable by remote-actuated means which are adapted to locate the channel member in alternate positions forming (a) a functional slide channel for the positioning member, and (b) anchorage engagement of the positioning member by reason of tilting of said channel member against the positioning member, said positioning member and carried spindle being progressively locatable toward a worksurface for operative engagement of the milling cutter therewith by a positioning screw disposed in threaded engagement with a threaded housing carried by said positioning member, said housing being selectively retractable from cutter-operative position by remote actuating means, whereby the positioning member and spindle may be preset for a desired work-contacting position and then be retracted for insertion and withdrawal from the bore of a workpiece and thus extended to work-contact position by said remote actuating means after insertion within such bore.

14. In combination with a planetary milling machine such as adapted to overlie a work surface within the bore of a fixed workpiece and having means for selective extension of a support structure carrying a generally radially directed cutter movable toward and away from functional cutter-engagement with such bore, the improvement wherein said extension means comprise a support for said cutter, guide means for selectively moving the support in a direction transverse to said bore, walls forming a longitudinal channel extending along an edge of said support in said transverse direction, a threaded nut and a positioning screw threadedly traversing said nut, both of which are located in said channel, one secured to said support and the other secured to said milling machine, whereby selective rotation of said screw effects transverse movement of said support and cutter, remote operating means for jointly retracting and extending the threaded nut and positioning screw lengthwise along said channel, whereby the support and cutter may be moved jointly toward and away from said worksurface, and remote operable brake means for anchoring said support at a selected radial position corresponding to desired work-location of the threaded nut, whereby the support and cutter may be preset for a required bore-contacting position when separated from the workpiece and then be retracted from the preset position for axial insertion and withdrawal of the milling machine from the mouth of the bore, and alternately extended to work-contact position after being placed within the bore.

15. A milling cutter according to claim 10 including a reset positioning element and means for functionally disengaging an attached gear train from a drive shaft of one of said worm gears, said means comprising mutually alignable spline means carried by said shaft and by a terminal gear of the gear train, and an axially reciprocable, splined coupling element selectively movable between alternate positions effecting (a) driving connection between said shaft and gear, and (b) driving connection between the reset positioning element and the gear-disengaged shaft, whereby said disengaged drive shaft can be arcuately moved by the engaged positioning element to a position corresponding to the start of a subsequent helical path of the milling cutter which path is parallel to and has the same pitch as that of a previous path.

16. A guidance and operating assembly for imparting correlated axial and rotational movement to a carried support structure which is displaceable along a longutudinal axis of the assembly, whereby an offcenter point of such structure may be moved in a helical path of selected pitch, said assembly comprising in combination:

a tubular housing supporting a threaded lead nut transversely disposed along the longitudinal axis thereof, first and second tubular sleeves spaced from each other and from said lead nut along said axis, each sleeve being disposed for independent rotation in a respective annular guideway of said housing, a guide member disposed in threaded engagement with said lead nut and having spline means which dispose it in longitudinal sliding engagement with said first sleeve, whereby the guide member may be driven by rotation of the first sleeve and simultaneously moved axially by its engagement with the lead nut, a hanger member distally carrying a longitudinally disposed support structure and having spline means in longitudinally displaceable engagement with said second sleeve, whereby the hanger member is simultaneously rotatable in unison with and by rotation of the second sleeve, the hanger member being attached proximately to said guide member by axial pivot means preventing its longitudinal separation therefrom, whereby the rotatable hanger member is also moved longitudinally by axial movement of the guide member, and drive means adapted to rotate each of said tubular sleeves concurrently at selected speeds and thus apply their resultant velocity ratio to the hanger member so as to move said offcenter point of the carried support structure in a helical path having a pitch dependent upon said ratio.

17. A guidance and operating assembly according to claim 16 in combination with an independently rotatable spindle disposed centrally traversing each of the tubular sleeves as well as said lead nut, guide member and hanger member, said support structure carrying a generally radially extending spindle segment having a distal cutting element which is thus given planetary movement along a helical path by movement of the hanger member.

18. A guidance and operating assembly according to claim 17 wherein said cutting element is a rotary milling cutter and said combination includes means for selective tilting of said rotary cutter relative to the cylindrical surface of a contacted workpiece.

19. A guidance and operating assembly according to claim 16 wherein said combination includes means for selective progressive radial extension of the segment of said rotatable spindle which carries said cutting element.

20. A guidance and operating assembly according to claim 16 wherein each of said tubular sleeves are ring gears and said drive means comprise a separate worm gear disposed in driving relation with each particular ring gear.

21. A guidance and operating assembly according to claim 20 including a gear train of selected gearage connecting said worm gears, which gear train thus determines the velocity ratio of the tubular sleeves.

22. A guidance and operating assembly according to claim 21 wherein said support structure carries a generally radially extending drive spindle thus movable by the hanger member in a plenetary and helical path, which spindle distally carries a cutting element.

23. A guidance and operating assembly according to claim 21 wherein said gear train is detachable for substitution of a like train of different gearage and comprises a dual-segment housing cassette, each segment thereof constituting a generally flat-sided gear support structure holding a radially aligned pair of meshing gears, one gear of each pair being carried on an idler shaft which traverses the two segments, the pair of segments being longitudinally staggered and having fastening means for securing them together with their adjacent planar faces disposed in juxtaposition with each other adjacent the traversing idler shaft, the other gear of each segment having associated coupling means for thrust engagement with a shaft of one of said worm gears.

* * * * *